US009269986B2

(12) United States Patent
Hwang et al.

(10) Patent No.: US 9,269,986 B2
(45) Date of Patent: Feb. 23, 2016

(54) ELECTROLYTE COMPOSITION, GEL POLYMER ELECTROLYTE, AND LITHIUM BATTERY INCLUDING THE GEL POLYMER ELECTROLYTE

(75) Inventors: Seung-sik Hwang, Seongnam-si (KR);
Moon-seok Kwon, Hwaseong-si (KR);
Myung-hoon Kim, Seoul (KR);
Jeong-kuk Shon, Cheonan-si (KR);
Min-sang Song, Seongnam-si (KR);
Jae-man Choi, Hwaseong-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 61 days.

(21) Appl. No.: 13/611,950

(22) Filed: Sep. 12, 2012

(65) Prior Publication Data
US 2013/0136998 A1 May 30, 2013

(30) Foreign Application Priority Data

Nov. 25, 2011 (KR) .................. 10-2011-0124394

(51) Int. Cl.
*H01M 6/14* (2006.01)
*H01M 10/0565* (2010.01)
*H01M 10/0564* (2010.01)

(52) U.S. Cl.
CPC ...... *H01M 10/0565* (2013.01); *H01M 10/0564* (2013.01); *H01M 2300/0025* (2013.01); *H01M 2300/0082* (2013.01)

(58) Field of Classification Search
CPC ............... H01M 10/0564; H01M 10/0565; H01M 2300/0025; H01M 4/131; H01M 4/5825; H01M 10/0082
USPC .................. 429/188, 200, 201, 303, 199, 300
See application file for complete search history.

(56) References Cited

FOREIGN PATENT DOCUMENTS

| CN | 101381421 | 3/2009 |
|---|---|---|
| JP | 8-225504 | 9/1996 |
| JP | 2002-293970 | 10/2002 |
| JP | 2002-324735 | 11/2002 |
| JP | 3391600 | * 1/2003 |
| KR | 1998-0006590 | 3/1998 |
| KR | 10-0393181 | 6/1998 |

OTHER PUBLICATIONS

English Translation of JP3391600, Japan Patent Office, Jan. 24, 2003.*
Calculation for Claims 19, 22, 24, calculation done by Jimmy Vo, Sep. 6, 2013.*
Xiang Wang, et al., *Synthesis of Spherical Polyelectrolyte Brushes by Thermo-controlled Emulsion Polymerization*, 2010, 1272-1275.

(Continued)

*Primary Examiner* — Milton I Cano
*Assistant Examiner* — Jimmy K Vo
(74) *Attorney, Agent, or Firm* — Cantor Colburn LLP

(57) ABSTRACT

An electrolyte composition including a macro azo initiator containing a polyethylene oxide repeating unit, and a multifunctional urethane acrylate-based monomer, a gel polymer electrolyte including the electrolyte composition, and a lithium battery including the gel polymer electrolyte.

14 Claims, 1 Drawing Sheet

(56) References Cited
OTHER PUBLICATIONS

Yu. V. Baskakova, et al., *Effect of 15-Crown-5 on the Charge Transfer Resistance at the Polymer Electrolyte/Modified Li-Electrode Interface*, 2006, 949-953.

Yu-Hao Liang, et al., *Synthesis and characterization of a new network polymer electrolyte containing polyether in the main chains and side chains*, 2008, 2376-2384.

* cited by examiner

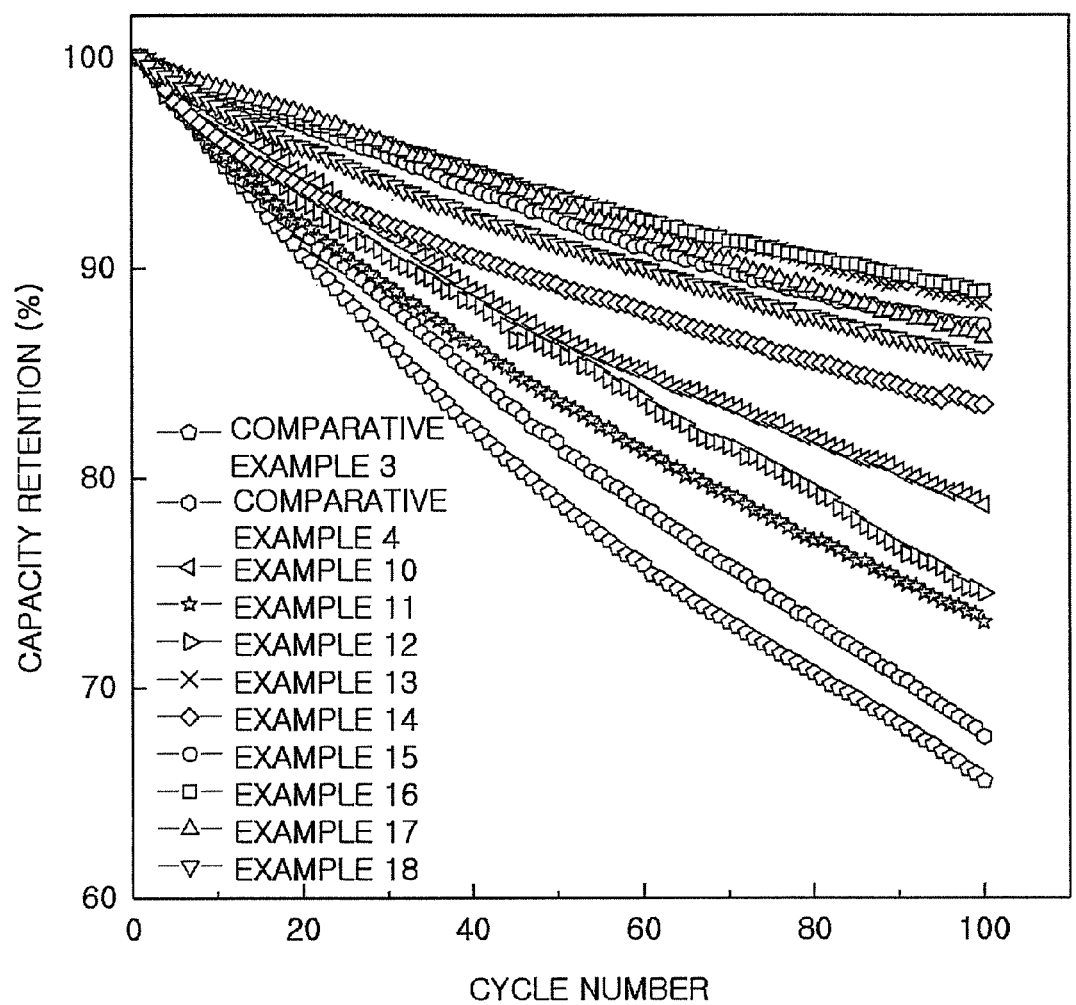

ELECTROLYTE COMPOSITION, GEL POLYMER ELECTROLYTE, AND LITHIUM BATTERY INCLUDING THE GEL POLYMER ELECTROLYTE

CROSS-REFERENCE TO RELATED APPLICATIONS

This application claims the benefit of Korean Patent Application No. 10-2011-0124394, filed on Nov. 25, 2011, in the Korean Intellectual Property Office, the disclosure of which is incorporated herein by reference.

BACKGROUND

1. Field of the Invention

The present disclosure relates to an electrolyte composition, a gel polymer electrolyte, and a lithium battery including the gel polymer electrolyte, and more particularly, to an electrolyte composition that improves ionic conductivity and lifetime characteristics, a gel polymer electrolyte including the electrolyte composition, and a lithium battery including the gel polymer electrolyte.

2. Description of the Related Art

Flexible electronic devices such as electronic paper are drawing a great deal of attention as next-generation products. Flexible electronic devices often use a secondary battery as an energy source. Secondary batteries for use in flexible electronic devices need to be flexible and free of an electrolyte leakage problem. Therefore, polymer electrolytes may be suitable for use in flexible electronic devices.

Existing polymer electrolytes may be prepared by photocuring or thermal curing methods in which an electrolyte solution containing a mixture of monomers and an initiator is irradiated by ultraviolet (UV) light or electron beams, or is heated. As compared with photocuring methods that require expensive systems and involve complicated processes, thermal curing can be performed using relatively low-cost systems and by less complicated processes.

However, there still is a demand for an electrolyte composition and polymer electrolyte that have an affinity with existing electrolytes, have improved ionic conductivities and lifetime characteristics, and are be easy to prepare.

SUMMARY

Provided are novel electrolyte compositions.

Provided are novel gel polymer electrolytes with improved lifetime characteristics.

Provided are lithium batteries including the gel polymer electrolyte.

Additional aspects will be set forth in part in the description which follows and, in part, will be apparent from the description, or may be learned through practice of the presented embodiments by those skilled in the art.

According to an aspect of the present disclosure, there is provided an electrolyte composition that comprises: an organic solvent; a lithium salt; a macro azo initiator that includes a polyethylene oxide repeating unit represented by Formula 1 below; and a multi-functional urethane acrylate-based monomer:

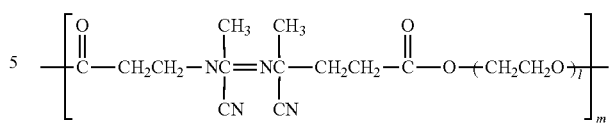

wherein, in Formula 1, l is from 5 to 200, and m is from 5 to 50.

The multi-functional urethane acrylate-based monomer may include a urethane diacrylate-based monomer represented by Formula 2 below:

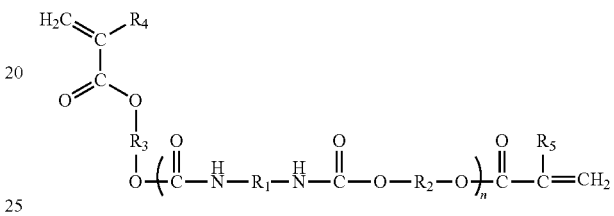

wherein, in Formula 2 above, n is from 1 to 1,000;

$R_1$, $R_2$, and $R_3$ are each, independently, a substituted or unsubstituted $C_{1-20}$ alkylene group, a substituted or unsubstituted $C_{5-20}$ cycloalkylene group, a substituted or unsubstituted $C_{6-20}$ arylene group, or $R_z$-A-$R_z$ where A is O, a single bond, an ester group, a carbonyl group, a carbonate group, a methylene group, an ethylene group, an oxymethylene group, or an oxyethylene group, and $R_z$ is, independently, a substituted or unsubstituted $C_{6-20}$ arylene group; and $R_4$ and $R_5$ are each, independently, a hydrogen atom or a methyl group, wherein if the $C_{1-20}$ alkylene, the $C_{5-20}$ cycloalkylene group, and the $C_{6-20}$ arylene group of R1, R2 or R3 are substituted, they each independently have a substituent selected from among a halogen group, a cyano group, —OR (where R is a hydrogen atom, a $C_{1-10}$ alkyl group, or a $C_{5-20}$ aryl group), —C(=O)$R_a$, —C(=O)O$R_a$, —OCO(O$R_a$), —(X)$_n$—NH$_2$ (where X is a $C_{1-10}$ alkyl group, or a $C_{1-10}$ alkoxy group, and n is an integer from 0 to 10), —C=N($R_a$), —S$R_a$, —S(=O)$R_a$, —S(=O)$_2R_a$, —P$R_a$, a $C_{1-20}$ alkyl group, a $C_{1-20}$ alkoxy group, a $C_{2-20}$ alkenyl group, a $C_{2-20}$ alkynyl group, a $C_{2-20}$ alkylene oxide group, a $C_{3-30}$ cycloalkyl group, a $C_{5-30}$ aryl group, a $C_{6-30}$ aryloxy group, a $C_{6-30}$ heteroaryl group, or a combination thereof, and wherein $R_a$ is a hydrogen atom, a $C_{1-10}$ alkyl group, or a $C_{6-20}$ aryl group.

The electrolyte composition may further include an acrylate monomer represented by Formula 3 below:

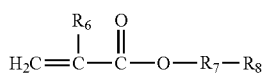

wherein, in Formula 3 above, $R_8$ is a hydrogen atom or a methyl group;

$R_7$ is a substituted or unsubstituted $C_1$-$C_{20}$ alkylene group; and $R_8$ is a hydrogen atom, a fluorine atom, a $C_{1-20}$ alkyl group, or a $C_{1-20}$ fluorinated alkyl group, wherein if the $C_{1-20}$ alkylene group of $R_7$ is substituted, it has a substituent selected from among a halogen group, a cyano group, —OR (where R is a hydrogen atom, a $C_{1-10}$ alkyl group, or a $C_{8-20}$ aryl group), —C(=O)$R_a$, —C(=O)O$R_a$, —OCO(O$R_a$), —(X)$_n$—NH$_2$ (where X is a $C_{1-10}$ alkyl group or a $C_{1-10}$ alkoxy group, and n is an integer from 0 to 10), —C=N($R_a$), —S$R_a$, —S(O)$R_a$, —S(=O)$_2R_a$, —P$R_a$, a $C_{1-20}$ alkyl group, a $C_{1-20}$ alkoxy group, a $C_{2-20}$ alkenyl group, a $C_{2-20}$ alkynyl group, a $C_{2-20}$ alkylene oxide group, a $C_{3-30}$ cycloalkyl group, a $C_{8-30}$ aryl group, a $C_{6-30}$ aryloxy group, a $C_{6-30}$ heteroaryl group, and a combination thereof, and wherein $R_a$ is a hydrogen atom, a $C_{1-10}$ alkyl group, or a $C_{8-20}$ aryl group.

The amount of the macro azo initiator may be from about 0.1 wt % to about 50 wt % based on the total weight of the electrolyte composition.

The amount of the multi-functional urethane acrylate-based monomer may be from about 1 wt % to about 50 wt % based on the total weight of the electrolyte composition.

The amount of the acrylate monomer of Formula 3 may be from about 0.1 wt % to about 30 wt % based on the total weight of the electrolyte composition.

According to another aspect of the present disclosure, there is provided a gel polymer electrolyte that comprises: an organic solvent; a lithium salt; and a block copolymer formed through polymerization of a multi-functional urethane acrylate-based monomer, employing a macro azo initiator that comprises a polyethylene oxide repeating unit represented by Formula 1 below:

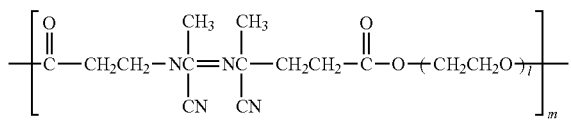

Formula 1 wherein, in Formula 1, l is from 5 to 200, and m is from 5 to 50.

The multi-functional urethane acrylate-based monomer may include a urethane diacrylate-based monomer represented by Formula 2 below:

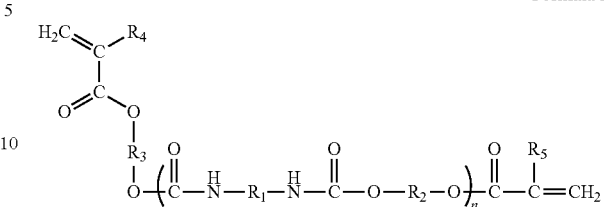

Formula 2 wherein, in Formula 2 above, n is from 1 to 1,000;

$R_1$, $R_2$, and $R_3$ are each independently a substituted or unsubstituted $C_{1-20}$ alkylene group, a substituted or unsubstituted $C_{5-20}$ cycloalkylene group, a substituted or unsubstituted $C_{6-20}$ arylene group, or $R_z$-A-$R_z$ where A is O, a single bond, an ester group, a carbonyl group, a carbonate group, a methylene group, an ethylene group, an oxymethylene group, or an oxyethylene group, and $R_z$ is, independently, a substituted or unsubstituted $C_{6-20}$ arylene group; and $R_4$ and $R_5$ are each, independently, a hydrogen atom or a methyl group, wherein if the $C_{1-20}$ alkylene group, the $C_{5-20}$ cycloalkylene group, or the $C_{5-20}$ arylene group are substituted, they each independently have a substituent selected from among a halogen group, a cyano group, —OR (where R is a hydrogen atom, a $C_{1-10}$ alkyl group, or a $C_{6-20}$ aryl group), —C(=O)$R_a$, —C(=O)O$R_a$, —OCO(O$R_a$), —(X)$_n$—NH$_2$ (where X is a $C_{1-10}$ alkyl group, or a $C_{1-10}$ alkoxy group, and n is an integer from 0 to 10), —C=N($R_a$), —S$R_a$, —S(=O)$R_a$, —S(=O)$_2R_a$, —P$R_a$, a $C_{1-20}$ alkyl group, a $C_{1-20}$ alkoxy group, a $C_{2-20}$ alkenyl group, a $C_{2-20}$ alkynyl group, a $C_{2-20}$ alkylene oxide group, a $C_{3-30}$ cycloalkyl group, a $C_{6-30}$ aryl group, a $C_{6-30}$ aryloxy group, a $C_{6-30}$ heteroaryl group, or a combination thereof, and wherein $R_a$ is a hydrogen atom, a $C_{1-10}$ alkyl group, or a $C_{6-20}$ aryl group.

The block copolymer may include a repeating unit represented by Formula 4 below:

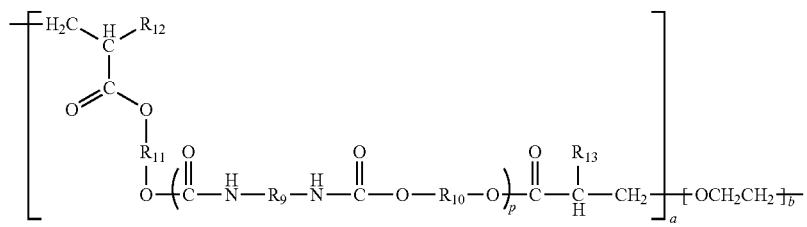

Formula 4 wherein, in Formula 4, a is from 1 to 2,000; b is from 5 to 200; p is from 1 to 1,000;

$R_9$, $R_{10}$, and $R_{11}$ are each, independently, a substituted or unsubstituted $C_{1-20}$ alkylene group, a substituted or unsubstituted $C_{5-20}$ cycloalkylene group, a substituted or unsubstituted $C_{6-20}$ arylene group, or $R_z$-A-$R_z$ where A is O, a single bond, an ester group, a carbonyl group, a carbonate group, a methylene group, an ethylene group, an oxymethylene group, or an oxyethylene group, and $R_z$ is a substituted or unsubstituted $C_{6-20}$ arylene group; and $R_{12}$ and $R_{13}$ are each, independently, a hydrogen atom or a methyl group;

wherein the substituent in the substituted groups is selected from among a halogen group, a cyano group, —OR (where R is a hydrogen atom, a $C_{1-10}$ alkyl group, or a $C_{6-20}$ aryl group), —C(=O)$R_a$, —C(=O)O$R_a$, —OCO(O$R_a$), —(X)$_n$—NH$_2$ (where X is a $C_{1-10}$ alkyl group, or a $C_{1-10}$ alkoxy group, and n is an integer from 0 to 10), —C=N($R_a$), —S$R_a$, —S(=O)$R_a$, —S(=O)$_2R_a$, —P$R_a$, a $C_{1-20}$ alkyl group, a $C_{1-20}$ alkoxy group, a $C_{2-20}$ alkenyl group, a $C_{2-20}$ alkynyl group, a $C_{2-20}$ alkylene oxide group, a $C_{3-30}$ cycloalkyl group, a $C_{5-30}$ aryl group, a $C_{6-30}$ aryloxy group, a $C_{6-30}$ heteroaryl group, or a combination thereof, wherein $R_a$ is a hydrogen atom, a $C_{1-10}$ alkyl group, or a $C_{6-20}$ aryl group.

The block copolymer may further include an acrylate repeating unit represented by Formula 5 below:

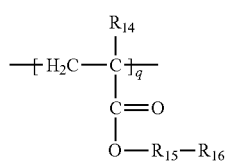

Formula 5 wherein, in Formula 5, q is from 1 to 5,000;

$R_{14}$ is a hydrogen atom or a methyl group;

$R_{15}$ is a substituted or unsubstituted $C_1$-$C_{20}$ alkylene group; and $R_{16}$ is a hydrogen atom, a fluorine atom, a $C_{1-20}$ alkyl group, or a $C_{1-20}$-fluorinated alkyl group, wherein if substituted, the $C_{1-20}$ alkylene group of $R_{15}$ has a substituent selected from among a halogen group, a cyano group, —OR (where R is a hydrogen atom, a $C_{1-10}$ alkyl group, or a $C_{6-20}$ aryl group), —C(=O)$R_a$, —C(=O)O$R_a$, —OCO(O$R_a$), —(X)$_n$—NH$_2$ (where X is a $C_{1-10}$ alkyl group or a $C_{1-10}$ alkoxy group, and n is an integer from 0 to 10), —C=N($R_a$), —S$R_a$, —S(=O)$R_a$, —S(=O)$_2R_a$, —P$R_a$, a $C_{1-20}$ alkyl group, a $C_{1-25}$ alkoxy group, a $C_{2-20}$ alkenyl group, a $C_{2-20}$ alkynyl group, a $C_{2-20}$ alkylene oxide group, a $C_{3-30}$ cycloalkyl group, a $C_{6-30}$ aryl group, a $C_{6-30}$ aryloxy group, a $C_{6-30}$ heteroaryl group, or a combination thereof, and wherein $R_a$ is a hydrogen atom, a $C_{1-10}$ alkyl group, or a $C_{6-20}$ aryl group.

The block copolymer may include a polyethylene oxide group (—CH$_2$CH$_2$O) and/or a urethane group (—NHCOO).

The block copolymer may form a cross-linked network matrix.

The amount of the block copolymer may be from about 3 wt % to about 70 wt % based on the total weight of the gel polymer electrolyte.

The amount of the macro azo initiator may be from about 0.1 wt % to about 50 wt % based on the total weight of the gel polymer electrolyte.

The amount of a repeating unit derived from the multi-functional urethane acrylate-based monomer may be from about 1 wt % to about 50 wt % based on the total weight of the gel polymer electrolyte.

The amount of the acrylate repeating unit represented by Formula 5 above may be from about 0.1 wt % to about 30 wt % based on the total weight of the gel polymer electrolyte.

According to another aspect of the present disclosure, there is provided a lithium battery including a positive electrode, a negative electrode, a separator, and the above-described gel polymer electrolyte.

BRIEF DESCRIPTION OF THE DRAWINGS

These and/or other aspects and advantages of the disclosure will become apparent and more readily appreciated from the following description of the embodiments, taken in conjunction with the accompanying drawings of which:

FIG. 1 is a graph illustrating the lifetime characteristics of a lithium battery according to an embodiment of the present disclosure.

DETAILED DESCRIPTION

Reference will now be made in detail to the present embodiments of the present disclosure, examples of which are illustrated in the accompanying drawings, wherein like reference numerals refer to like elements throughout. The embodiments are described below in order to explain the present disclosure by referring to the figures. According to an embodiment of the present disclosure, an electrolyte composition includes: an organic solvent; a lithium salt; a macro azo initiator that contains a polyethylene oxide repeating unit represented by Formula 1 below; and a multi-functional urethane acrylate-based monomer:

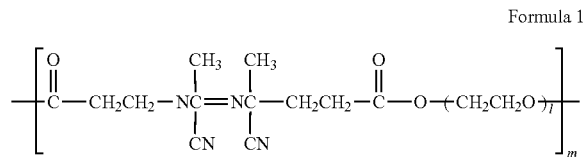

Formula 1

In Formula 1, l is from 5 to 200, and m is from 5 to 50.

The multi-functional urethane acrylate-based monomer may include a urethane diacrylate-based monomer represented by Formula 2 below:

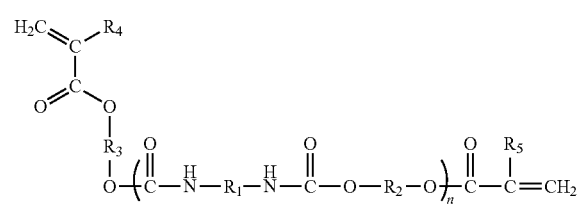

Formula 2

In Formula 2 above, n is from 1 to 1,000;

$R_1$, $R_2$, and $R_3$ are each independently a substituted or unsubstituted $C_{1-20}$ alkylene group, a substituted or unsubstituted $C_{5-20}$ cycloalkylene group, a substituted or unsubstituted $C_{6-20}$ arylene group, or $R_z$-A-$R_z$ where A is O, a single bond, an ester group, a carbonyl group, a carbonate group, a methylene group, an ethylene group, an oxymethylene group, or an oxyethylene group, and $R_z$ is a substituted or unsubstituted $C_{6-20}$ arylene group; and $R_4$ and $R_5$ are each independently a hydrogen atom or a methyl group;

wherein if the $C_{1-20}$ alkylene group, the $C_{5-20}$ cycloalkylene group, or the $C_{6-20}$ arylene group of $R_1$, $R_2$ or $R_3$ is substituted, they each independently have a substituent selected from among a halogen group, a cyano group, —OR (where R is a hydrogen atom, a $C_{1-10}$ alkyl group, or a $C_{6-20}$ aryl group), —C(=O)$R_a$, —C(=O)O$R_a$, —OCO(O$R_a$), —(X)$_n$—NH$_2$ (where X is a $C_{1-10}$ alkyl group, or a $C_{1-10}$ alkoxy group, and n is an integer from 0 to 10), —C=N($R_a$), —S$R_a$, —S(=O)$R_a$, —S(=O)$_2R_a$, —P$R_a$, a $C_{1-20}$ alkyl group, a $C_{1-20}$ alkoxy group, a $C_{2-20}$ alkenyl group, a $C_{2-20}$ alkynyl group, a $C_{2-20}$ alkylene oxide group, a $C_{3-30}$ cycloalkyl group, a $C_{6-30}$ aryl group, a $C_{6-30}$ aryloxy group, a $C_{6-30}$ heteroaryl group, or a combination thereof, and wherein $R_a$ is a hydrogen atom, a $C_{1-10}$ alkyl group, or a $C_{6-20}$ aryl group.

For example, the substituent may be each, independently, fluorine, a fluorine-substituted $C_{1-5}$ alkyl group, an unsubstituted $C_{1-5}$ alkyl group, a hydroxyl-substituted $C_{1-20}$ alkylene group, a $C_{5-20}$ cycloalkylene group, or a $C_{6-20}$ arylene group.

The term "multi-functional urethane acrylate-based monomer" used herein refers to a monomer containing, for example, about 2-6 acrylate groups at opposite terminals. Non-limiting examples of the multi-functional urethane acrylate-based monomer are "urethane diacrylate-based monomer" and "urethane triacrylate-based monomer".

The multi-functional urethane acrylate-based monomer used herein refers to a "multi-functional urethane acrylate monomer" and a "multi-functional urethane acrylate derivative monomer".

Examples of the "$C_{1-20}$ alkylene group" in Formula 2 are methylene, ethylene, propylene, and isobutylene; examples of the "$C_{5-20}$ cycloalkylene group" are cyclopentylene and cyclohexylene; and an example of the "$C_{6-20}$ arylene group" is phenylene, and the like.

In Formula 2 above, the "ester group" may be represented by —C(=O)O—, the "carbonyl group" may be represented by —C(=O)—, the "carbonate group" may be represented by —OC(=O)O—, the "oxymethylene group" may be represented by —OCH$_2$—, and the "oxyethylene group" may be represented by —OCH$_2$CH$_2$—.

Substituent(s) on the $C_{1-20}$ alkylene group, $C_{5-20}$ cycloalkylene group, or $C_{6-20}$ arylene group in Formula 2 above may be defined as follows.

Non-limiting examples of the $C_{1-20}$ alkyl group in Formula 2 are methyl, ethyl, propyl, isobutyl, sec-butyl, tert-butyl, neo-butyl, iso-amyl, and hexyl. Examples of the C1-$C_{20}$ alkoxy group in Formula 2 are methoxy, ethoxy, and propoxy. Examples of the $C_{2-20}$ alkenyl group in Formula 2 are vinylene and allylene. The $C_{2-20}$ alkynyl group in Formula 2 may be acetylene. Examples of the $C_{2-20}$ alkylene oxide group in Formula 2 are ethylene oxide, propylene oxide, and butylene oxide. Examples of the $C_{3-30}$ cycloalkyl group in Formula 2 are cyclopropyl, cyclobutyl, cyclopentyl, and cyclohexyl. The $C_{6-30}$ aryl group in Formula 2 may be used alone or in combination, and refers to an aromatic system containing at least one ring. Examples of the aryl group are phenyl, naphthyl, and tetrahydronaphthyl. An example of the $C_{6-30}$ aryloxy group in Formula 2 is phenoxy. The $C_{6-30}$ heteroaryl group in Formula 2 refers to an organic compound including a heteroatom selected from among nitrogen (N), oxygen (O), phosphorous (P) and sulfur (S), wherein the other ring atoms of the organic compound are all carbon. An example of the $C_{6-30}$ heteroaryl group is pyridyl.

The macro azo initiator contains an azo group (—CN=NC—) and a polyethylene oxide (—CH$_2$CH$_2$O—) repeating unit. The azo group (—CN=NC—) in the macro azo initiator serves as a polymerization initiator that decomposes under the influence of heat or light irradiation, thus generating radicals. The polyethylene oxide repeating unit may be readily introduced into a polymer main chain, forming a cross-liked block copolymer by polymerization with the urethane diacrylate-based monomer.

The electrolyte composition including the macro azo initiator and the multi-functional urethane acrylate-based monomer improves the solubility and conductivity of lithium ions dissolved in an organic solvent, because the polyethylene oxide repeating unit is uniformly distributed in the polymer main chain by a uniform size, and can be functioned as an ion transfer channel by forming lithium-ion conducting nanostructured tunnel.

Whereas, the electrolyte composition including a cross-linked urethane structure as a back-bone formed from a polymer containing a polyethylene oxide repeating unit used as a polyol, and a grafted polyethylene oxide repeating unit in the cross-linked urethane structure as a soft segment can not be uniform in the conductivity of lithium ions, due to randomly distributed a polyethylene oxide repeating unit of lithium-ion conducting channel.

The electrolyte composition may further include an acrylate monomer represented by Formula 3 below:

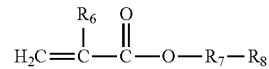

Formula 3

In Formula 3 above, $R_6$ is a hydrogen atom or a methyl group;

$R_7$ is a substituted or unsubstituted $C_1$-$C_{20}$ alkylene group; and $R_8$ is a hydrogen atom, a fluorine atom, a $C_{1-20}$ alkyl group, or a $C_{1-20}$ fluorinated alkyl group.

If the $C_{1-20}$ alkylene group is substituted, it has a substituent selected from among a halogen group, a cyano group, —OR (where R is a hydrogen atom, a $C_{1-10}$ alkyl group, or a $C_{6-20}$ aryl group), —C(=O)$R_a$, —C(=O)O$R_a$, —OCO (O$R_a$), —(X)$_n$—NH$_2$ (where X is a $C_{1-10}$ alkyl group or a $C_{1-10}$ alkoxy group, and n is an integer from 0 to 10), —C=N ($R_a$), —S$R_a$, S(=O)$R_a$, —S(=O)$_2R_a$, —P$R_a$, a $C_{1-20}$ alkyl group, a $C_{1-20}$ alkoxy group, a $C_{2-20}$ alkenyl group, a $C_{2-20}$ alkynyl group, a $C_{2-20}$ alkylene oxide group, a $C_{3-30}$ cycloalkyl group, a $C_{6-30}$ aryl group, a $C_{6-30}$ aryloxy group, a $C_{6-30}$ heteroaryl group, or a combination thereof, and wherein $R_a$ is a hydrogen atom, a $C_{1-10}$ alkyl group, or a $C_{6-20}$ aryl group. For example, the substituted $C_{1-20}$ alkylene may be each independently fluorine, a fluorine-substituted $C_{1-5}$ alkyl group, a unsubstituted $C_{1-5}$ alkyl group, or a hydroxyl-substituted $C_{1-20}$ alkylene group.

Examples of the "$C_{1-20}$ alkylene group" in Formula 3 above, and examples of, "ester group", "carbonyl group", "carbonate group", "oxymethylene group", and "oxyethylene group" are the same as those described in conjunction with Formula 2 above. Substituent(s) on the $C_{1-20}$ alkylene group, $C_{5-20}$ cycloalkylene group, or $C_{6-20}$ arylene group in Formula 3 above may be the same as those defined in conjunction with Formula 2 above.

In some embodiments, the electrolyte composition may further include an acrylate monomer represented by Formula 3, thus resulting in improvements in flexibility, binding strength, and mechanical strength, due to having the functional groups described above.

The polyethylene oxide repeating unit of the macro azo initiator may have a number average molecular weight (Mn) of from about 200 to about 20,000, and in some embodiments, from about 1,000 to about 10,000, and in some other embodiments, from about 2,000 to about 6,000.

The macro azo initiator may have a number average molecular weight (Mn) of from about 10,000 to about 100,000, and in some embodiments, from about 20,000 to about 80,000, and in some other embodiments, from about 20,000 to about 60,000. In some embodiments, the number average molecular weight (Mn) of the macro azo initiator may be about 5 to about 50 times greater than that of the polyethylene oxide repeating unit.

The multi-functional urethane acrylate-based monomer may have a number average molecular weight (Mn) of from about 250 to about 100,000, and in some embodiments, may have an Mn of from about 400 to about 80,000, and in some other embodiments, may have an Mn of from about 600 to about 60,000.

When the polyethylene oxide repeating unit and the macro azo initiator have the number average molecular weights within the above ranges, there is formed a cross-linked block copolymer with the multi-functional urethane acrylate-based monomer having a number average molecular weight within the above ranges, the polyethylene oxide repeating unit and the macro azo initiator produce a cross-linked block copolymer having a low cross-linking density which facilitates the migration of lithium ions. The low cross-linking density also leads to a reduction in the amount of monomers forming the block copolymer.

The acrylate monomer of Formula 3 above may include at least one selected from the group consisting of methyl acrylate, methyl methacrylate, ethyl acrylate, ethyl methacrylate, propyl acrylate, propyl methacrylate, butyl acrylate, butyl methacrylate, hexyl acrylate, hexyl methacrylate, ethylhexyl acrylate, ethylhexyl methacrylate, 2,2,2-trifluoroethyl acrylate, 2,2,2-trifluoroethyl methacrylate, 2,2,3,3-tetrafluoropropyl acrylate, 2,2,3,3-tetrafluoropropyl methacrylate, 1,1,1,3,3,3-hexafluoro isopropyl acrylate, 1,1,1,3,3,3-hexafluoro isopropyl methacrylate, 2,2,3,3,4,4,4-heptafluorobutyl acrylate, 2,2,3,3,4,4,4-heptafluorobutyl methacrylate, 2,2,3,3,4,4,5,5-octafluoropentyl acrylate, 2,2,3,3,4,4,5,5-octafluoropentyl methacrylate, 2,2,3,3,4,4,5,5,6,6,7,7-dodecafluoroheptyl acrylate, 2,2,3,3,4,4,5,5,6,6,7,7-dodecafluoroheptyl methacrylate, 3,3,4,4,5,5,6,6,7,7,8,8-tridecafluorooctyl acrylate, and 3,3,4,4,5,5,6,6,7,7,8,8-tridecafluorooctyl methacrylate.

In some embodiments, the acrylate monomer of Formula 3 above may include at least one selected from the group consisting of ethyl acrylate, ethyl methacrylate, propyl acrylate, propyl methacrylate, butyl acrylate, butyl methacrylate, hexyl acrylate, hexyl methacrylate, ethylhexyl acrylate, ethylhexyl methacrylate, 2,2,2-trifluoroethyl acrylate, 2,2,2-trifluoroethyl methacrylate, 2,2,3,3-tetrafluoropropyl acrylate, 2,2,3,3-tetrafluoropropyl methacrylate, 1,1,1,3,3,3-hexafluoro isopropyl acrylate, 1,1,1,3,3,3-hexafluoro isopropyl methacrylate, 2,2,3,3,4,4,5,5-octafluoropentyl acrylate, and 2,2,3,3,4,4,5,5-octafluoropentyl methacrylate.

The acrylate monomer including a functional group such as alkyl or fluoroalkyl will change the physical properties of the electrolyte composition to yield improved flexibility, binding strength, and mechanical strength.

The lithium salt may be but is not limited to at least one selected from the group consisting of $LiBF_4$, $LiPF_6$, $LiAsF_6$, $LiSbF_6$, and $LiPF_3(CF_2CF_3)$. Any common lithium salt used in the art may be used.

The organic solvent may, but is not limited to a high-dielectric constant (high-k) solvent, a low-boiling point solvent, or a mixture thereof. Any common organic solvent used in the art may be used.

The amount of the macro azo initiator may be from about 0.1 to about 50 wt %, and in some embodiments, from about 0.2 to about 40 wt %, and in some other embodiments, from about 0.5 to about 30 wt %, based on the total weight of the electrolyte composition.

When the amount of the macro azo initiator is within these ranges, dissociation of lithium ions is facilitated, and a block copolymer that provides easy migration paths for lithium ions is formed.

The amount of the multi-functional urethane acrylate-based monomer may be from about 1 to about 50 wt %, and in some embodiments, from about 2 to about 50 wt %, and in some other embodiments, from about 2 to about 45 wt %, based on the total weight of the electrolyte composition.

When the amount of the multi-functional urethane acrylate-based monomer is within these ranges, the electrolyte composition will form a block copolymer that is able to facilitate the migration of lithium ions with low cross-linking density.

The amount of the acrylate monomer of Formula 3 may be from about 0.1 to about 30 wt %, and in some embodiments, from about 0.3 to about 30 wt %, and in some other embodiments, from about 0.5 to about 30 wt %, based on the total weight of the electrolyte composition.

When the amount of the acrylate monomer is within these ranges, the electrolyte composition including an ester bond (—C(=O)O—) as a polar function group will improve affinity with a polar organic solvent contained in the electrolyte solution in a polymer as a polymerization product with the macro azo initiator, and have improved flexibility, binding strength, and mechanical strength.

The amount of the lithium salt may be from about 5 to about 50 wt %, and in some embodiments, from about 10 to about 40 wt %, and in some other embodiments, from about 15 to about 30 wt %, based on the total weight of the electrolyte composition.

The amount of the organic solvent may be from about 30 to about 95 wt %, and in some embodiments, from about 40 to about 90 wt %, and in some other embodiments, from about 50 to about 90 wt %, based on the total weight of the electrolyte composition.

According to an embodiment of the present disclosure, a gel polymer electrolyte includes: an organic solvent; a lithium salt; and a block copolymer formed through polymerization of a macro azo initiator including a polyethylene oxide repeating unit represented by Formula 1 below, and a multi-functional urethane acrylate-based monomer:

Formula 1

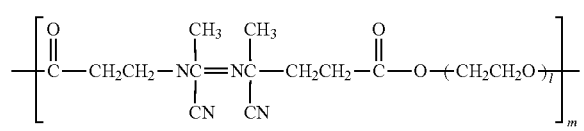

In Formula 1, l is from 5 to 200, and m is from 5 to 50.

The multi-functional urethane acrylate-based monomer may include a urethane diacrylate-based monomer represented by Formula 2 below:

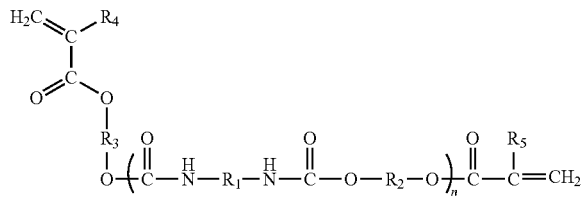

Formula 2

In Formula 2, n is from 1 to 1,000;

$R_1$, $R_2$, and $R_3$ are each, independently, a substituted or unsubstituted $C_{1-20}$ alkylene group, a substituted or unsubstituted $C_{5-20}$ cycloalkylene group, a substituted or unsubstituted $C_{6-20}$ arylene group, or $R_z$-A-$R_z$ where A is a single bond, an ester group, an ether group, a carbonyl group, a carbonate group, a methylene group, an ethylene group, an oxymethylene group, or an oxyethylene group, and $R_z$ is a substituted or unsubstituted $C_{6-20}$ arylene group; and $R_4$ and $R_5$ are each, independently, a hydrogen atom or a methyl group;

wherein if the $C_{1-20}$ alkylene group, the $C_{5-20}$ cycloalkylene, or the $C_{6-20}$ arylene group of $R_1$, $R_2$ or $R_3$ are substituted, they each independently have a substituent selected from among a halogen group, a cyano group, —OR (where R is a hydrogen atom, a $C_{1-10}$ alkyl group, or a $C_{6-20}$ aryl group), —C(=O)$R_a$, —C(=O)O$R_a$, —OCO(O$R_a$), —(X)$_n$—NH$_2$ (where X is a $C_{1-10}$ alkyl group, or a $C_{1-10}$ alkoxy group, and n is an integer from 0 to 10), —C=N($R_a$), —S$R_a$, —S(=O)$R_a$, —S(=O)$_2R_a$, —P$R_a$, a $C_{1-20}$ alkyl group, a $C_{1-20}$ alkoxy group, a $C_{2-20}$ alkenyl group, a $C_{2-20}$ alkynyl group, a $C_{2-20}$ alkylene oxide group, a $C_{3-30}$ cycloalkyl group, a $C_{6-30}$ aryl group, a $C_{6-30}$ aryloxy group, a $C_{6-30}$ heteroaryl group, or a combination thereof, wherein $R_a$ is a hydrogen atom, a $C_{1-10}$ alkyl group, or a $C_{6-20}$ aryl group. For example, the substituent may be each, independently, fluorine, a fluorine-substituted $C_{1-5}$ alkyl group, a unsubstituted $C_{1-5}$ alkyl group, a hydroxyl-substituted $C_{1-20}$ alkylene group.

The gel polymer electrolyte including the polyethylene oxide group (—CH$_2$CH$_2$O) and an urethane group (—NH-COO) can form a block copolymer. The urethane group can impregnate the electrolyte and act as a mechanical support. The polyethylene oxide group can facilitate the dissociation of lithium ions and provide easy migration paths for lithium ions due to a uniform distribution by a uniform size. The gel polymer electrolyte is also easily prepared.

Whereas, the gel polymer electrolyte including a cross-linked urethane structure as a back-bone formed from a polymer containing a polyethylene oxide repeating unit used as a polyol, and a grafted polyethylene oxide repeating unit in the cross-linked urethane structure as a soft segment can not be uniform in the conductivity of lithium ions, due to randomly distributed a polyethylene oxide group of lithium-ion conducting channel. Furthermore, the gel polymer electrolyte including a cross-linked urethane structure as a back-bone, and a grafted polyethylene oxide repeating unit in the cross-linked urethane structure as a soft segment can not be easily prepared through several steps.

The block copolymer may include a repeating unit represented by Formula 4 below:

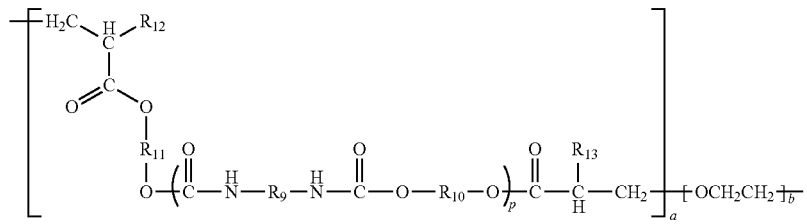

Formula 4

In Formula 4, a is from 1 to 2,000; b is from 5 to 200; p is from 1 to 1,000;

$R_9$, $R_{10}$, and $R_{11}$ are each, independently, a substituted or unsubstituted $C_{1-20}$ alkylene group, a substituted or unsubstituted $C_{5-20}$ cycloalkylene group, a substituted or unsubstituted $C_{6-20}$ arylene group, or $R_z$-A-$R_z$ where A is O, a single bond, an ester group, a carbonyl group, a carbonate group, a methylene group, an ethylene group, an oxymethylene group, or an oxyethylene group, and $R_z$ is, independently, a substituted or unsubstituted $C_{6-20}$ arylene group; and $R_{12}$ and $R_{13}$ are each independently a hydrogen atom or a methyl group, wherein the substituent in the substituted groups are, independently, selected from among a halogen group, a cyano group, —OR (where R is a hydrogen atom, a $C_{1-10}$ alkyl group, or a $C_{6-20}$ aryl group), —C(=O)$R_a$, —C(=O)O$R_a$, —OCO(O$R_a$), —(X)$_n$—NH$_2$ (where X is a $C_{1-10}$ alkyl group, or a $C_{1-10}$ alkoxy group, and n is an integer from 0 to 10), —C=N($R_a$), —S$R_a$, —S(=O)$R_a$, —S(=O)$_2R_a$, —P$R_a$, a $C_{1-20}$ alkyl group, a $C_{1-20}$ alkoxy group, a $C_{2-20}$ alkenyl group, a $C_{2-20}$ alkynyl group, a $C_{2-20}$ alkylene oxide group, a $C_{3-30}$ cycloalkyl group, a $C_{6-30}$ aryl group, a $C_{6-30}$ aryloxy group, a $C_{6-30}$ heteroaryl group, or a combination thereof, and wherein $R_a$ is a hydrogen atom, a $C_{1-10}$ alkyl group, or a $C_{6-20}$ aryl group.

For example, the substituent may be, independently, fluorine, a fluorine-substituted $C_{1-5}$ alkyl group, a unsubstituted $C_{1-5}$ alkyl group, a hydroxyl-substituted $C_{1-20}$ alkylene group, a $C_{5-20}$ cycloalkylene group, or a $C_{6-20}$ arylene group.

Examples of the "$C_{1-20}$ alkylene group", the "$C_{5-20}$ cycloalkylene group", and the "$C_{6-20}$ arylene group" in Formula 4, and examples of the "ester group", "carbonyl group", "carbonate group", "oxymethylene group", and "oxyethylene group" are the same as those described in conjunction with Formula 2 above. Substituent(s) of the $C_{1-20}$ alkylene group, $C_{5-20}$ cycloalkylene group, or $C_{6-20}$ arylene group in Formula 4 above may be the same as those defined in conjunction with Formula 2 above.

The block copolymer may further include an acrylate repeating unit represented by Formula 5 below:

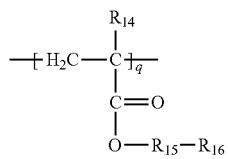

Formula 5

In Formula 5, q is from 1 to 5,000;

$R_{14}$ is a hydrogen atom or a methyl group;

$R_{15}$ is a substituted or unsubstituted $C_1$-$C_{20}$ alkylene group; and $R_{16}$ is a hydrogen atom, a fluorine atom, a $C_{1-20}$ alkyl group, or a $C_{1-20}$ fluorinated alkyl group;

The $C_{1-20}$ alkylene group of $R_{15}$, if substituted, has a substituent selected from among a halogen group, a cyano group, —OR (where R is a hydrogen atom, a $C_{1-10}$ alkyl group, or a $C_{6-20}$ aryl group), —C(=O)$R_a$, —C(=O)O$R_a$, —OCO(O$R_a$), —(X)$_n$—NH$_2$ (where X is a $C_{1-10}$ alkyl group or a $C_{1-10}$ alkoxy group, and n is an integer from 0 to 10), —C=N($R_a$), —S$R_a$, —S(=O)$R_a$, —S(=O)$_2R_a$, —P$R_a$, a $C_{1-20}$ alkyl group, a $C_{1-20}$ alkoxy group, a $C_{2-20}$ alkenyl group, a $C_{2-20}$ alkynyl group, a $C_{2-20}$ alkylene oxide group, a $C_{3-30}$ cycloalkyl group, a $C_{6-30}$ aryl group, a $C_{6-30}$ aryloxy group, a $C_{6-30}$ heteroaryl group, or a combination thereof, and wherein $R_a$ is a hydrogen atom, a $C_{1-10}$ alkyl group, or a $C_{6-20}$ aryl group. For example, the substituted $C_{1-20}$ alkylene group may be) fluorine, a fluorine-substituted $C_{1-5}$ alkyl group, a unsubstituted $C_{1-5}$ alkyl group, or a hydroxyl-substituted $C_{1-20}$ alkylene group.

Examples of the "$C_{1-20}$ alkylene group" in Formula 5, and examples of the "ester group", "carbonyl group", "carbonate group", "oxymethylene group", and "oxyethylene group" are the same as those described in conjunction with Formula 2 above. Substituent(s) of the $C_{1-20}$ alkylene group, $C_{5-20}$ cycloalkylene group, or $C_{6-20}$ arylene group in Formula 5 above may be the same as those defined in conjunction with Formula 2 above.

In some embodiments, the gel polymer electrolyte may further include an acrylate monomer represented by Formula 5 above, thus improving affinity with the electrolyte, and resulting in improvements in flexibility, binding strength, and strength, due to having the functional groups described above.

The block copolymer may include a polyethylene oxide group (—CH$_2$CH$_2$O) and/or a urethane group (—NHCOO).

The block copolymer may form a cross-linked network matrix.

As an example, the block copolymer may be formed as follows.

The azo group (—CN=NC—) in the macro azo initiator serves as a polymerization initiator that decomposes under the influence of heat or light irradiation, thus generating radicals. The radicals from the azo group polymerize with a vinyl monomer in the multi-functional urethane acrylate-based monomer to form a block copolymer with repeating groups of a polyethylene oxide group (—CH$_2$CH$_2$O) and urethane group (—NHCOO), and a block copolymer with a cross-linked network matrix. These block copolymers may be formed using any of a variety of polymerization methods used in the art, for example, radical polymerization, solution polymerization, and bulk polymerization.

Due to the macro azo initiator with polyethylene oxide repeating units and the multi-functional urethane acrylate-based monomer, the cross-linked block copolymer with long molecular chains will have low cross-linking densities that facilitate the migration of lithium ions. The polyethylene oxide repeating units in the block copolymer will facilitate the dissociation of lithium ions and provide easy migration paths for lithium ions, thereby improving lithium ion conductivity of the gel polymer electrolyte.

The amount of the block copolymer may be from about 3 to about 70 wt %, and in some embodiments, from about 3 to about 65 wt %, and in some other embodiments, from about 3 to about 60 wt %, based on the total weight of the gel polymer electrolyte.

When the amount of the block copolymer is within these ranges due to a low cross-linking density, lithium ion conductivity will be improved. The gel polymer electrolyte will suppress an irreversible reaction between an electrode active material and an electrolyte, and will maintain the structure of the electrode active material and electrodes as a structural support. Thus, a lithium battery with this gel polymer electrolyte will have improved lifetime characteristics.

The polyethylene oxide repeating unit of the macro azo initiator may have a number average molecular weight (Mn) of from about 200 to about 20,000, and in some embodiments, from about 1,000 to about 10,000, and in some other embodiments, from about 2000 to about 6000.

The macro azo initiator may have a number average molecular weight (Mn) of from about 10,000 to about 100,000, and in some embodiments, from about 20,000 to about 80,000, and in some other embodiments, from about 20,000 to about 60,000. In some embodiments, the number average molecular weight (Mn) of the macro azo initiator may be about 5 to about 50 times greater than that of the polyethylene oxide repeating unit.

The amount of the macro azo initiator may be from about 0.1 to about 50 wt %, and in some embodiments, from about 0.2 to about 40 wt %, and in some other embodiments, from about 0.5 to about 30 wt %, based on the total weight of the gel polymer electrolyte.

When the number average molecular weights of the polyethylene oxide repeating unit and the macro azo initiator are within these ranges, the gel electrolyte polymer includes long molecular chains with low cross-linking densities, and thus will facilitate the migration of lithium ions.

When the amount of the macro azo initiator is within these ranges, dissociation of lithium ions will be facilitated, and a block copolymer that provides easy migration paths of lithium ions will be formed. Thus, the gel polymer electrolyte including the macro azo initiator will improve lithium ion conductivity.

The multi-functional urethane acrylate-based monomer may have a number average molecular weight (Mn) of from about 250 to about 100,000, and in some embodiments, may have an Mn of from about 400 to about 80,000, and in some other embodiments, may have an Mn of from about 600 to about 60,000.

The amount of a repeating unit derived from the multi-functional urethane acrylate-based monomer may be from about 1 to about 50 wt %, and in some embodiments, from about 2 to about 50 wt %, and in some other embodiments, may be from about 2 to about 45 wt %, based on the total weight of the gel polymer electrolyte.

When a block copolymer is formed through cross-linking with the repeating unit derived from the multi-functional urethane acrylate-based monomer having a number average molecule weight within the above ranges, the block copolymer will have a low cross-linking density and will facilitate the migration of lithium ions.

Due to the low cross-linking density of the block copolymer, a gel polymer electrolyte will be formed using the block copolymer in an amount within the above ranges.

The acrylate repeating unit represented by Formula 5 above may include at least one selected from the group consisting of a methyl acrylate repeating unit, a methyl methacrylate repeating unit, an ethyl acrylate repeating unit, an ethyl methacrylate repeating unit, a propyl acrylate repeating unit, a propyl methacrylate repeating unit, a butyl acrylate repeating unit, a butyl methacrylate repeating unit, a hexyl acrylate repeating unit, a hexyl methacrylate repeating unit, an ethylhexyl acrylate repeating unit, an ethylhexyl methacrylate repeating unit, a 2,2,2-trifluoroethyl acrylate repeating unit, a 2,2,2-trifluoroethyl methacrylate repeating unit, a 2,2,3,3-tetrafluoropropyl acrylate repeating unit, a 2,2,3,3-tetrafluoropropyl methacrylate repeating unit, a 1,1,1,3,3,3-hexafluoro isopropyl acrylate repeating unit, a 1,1,1,3,3,3-hexafluoro isopropyl methacrylate repeating unit, a 2,2,3,3,4,4,4-heptafluorobutyl acrylate repeating unit, a 2,2,3,3,4,4,4-heptafluorobutyl methacrylate repeating unit, a 2,2,3,3,4,4,5,5-octafluoropentyl acrylate repeating unit, a 2,2,3,3,4,4,5,5-octafluoropentyl methacrylate repeating unit, a 2,2,3,3,4,4,5,5,6,6,7,7-dodecafluoroheptyl acrylate repeating unit, a 2,2,3,3,4,4,5,5,6,6,7,7-dodecafluoroheptyl methacrylate repeating unit, a 3,3,4,4,5,5,6,6,7,7,8,8,8-tridecafluorooctyl acrylate repeating unit, and a 3,3,4,4,5,5,6,6,7,7,8,8,8-tridecafluorooctyl methacrylate repeating unit.

For example, the acrylate repeating unit of Formula 5 may include at least one selected from the group consisting of ethyl acrylate repeating unit, ethyl methacrylate repeating unit, propyl acrylate repeating unit, propyl methacrylate repeating unit, butyl acrylate repeating unit, butyl methacrylate repeating unit, hexyl acrylate repeating unit, hexyl methacrylate repeating unit, ethylhexyl acrylate repeating unit, ethylhexyl methacrylate repeating unit, 2,2,2-trifluoroethyl acrylate repeating unit, 2,2,2-trifluoroethyl methacrylate repeating unit, 2,2,3,3-tetrafluoropropyl acrylate repeating unit, 2,2,3,3-tetrafluoropropyl methacrylate repeating unit, 1,1,1,3,3,3-hexafluoro isopropyl acrylate repeating unit, 1,1,1,3,3,3-hexafluoro isopropyl methacrylate repeating unit, 2,2,3,3,4,4,5,5-octafluoropentyl acrylate repeating unit 및 2,2,3,3,4,4,5,5-octafluoropentyl methacrylate repeating unit.

The acrylate repeating unit including a functional group such as alkyl or fluoroalkyl will change the physical properties of the electrolyte composition to result in improved flexibility, binding strength, and mechanical strength.

The amount of the acrylate repeating unit of Formula 5 may be from about 0.1 to about 30 wt %, and in some embodiments, from about 0.3 to about 30 wt %, and in some other embodiments, from about 0.5 to about 30 wt %, based on the total weight of the gel polymer electrolyte.

When the amount of the acrylate repeating is within these ranges, the gel polymer electrolyte including an ester bond (—C(=O)O—) as a polar function group in molecules will have improved affinity with a polar organic solvent of the electrolyte solution in a polymer derived through polymerization, and have improved flexibility, binding strength, and mechanical strength.

The lithium salt may be, but is not limited to at least one selected from the group consisting of $LiBF_4$, $LiPF_6$, $LiAsF_6$, $LiSbF_6$, and $LiPF_3(CF_2CF_3)$. Any common lithium salt used in the art may be used.

Examples of the organic solvent are a high-dielectric constant (high-k) solvent, a low-boiling point solvent, and a mixed solvent thereof. A high-k solvent with a dielectric constant of from about 30 to about 100 will be suitable for use in the gel polymer electrolyte. A low-boiling point solvent having a boiling point of from about 77 to about 150° C. will be suitable for use in the gel polymer electrolyte. However, any organic solvent used in the art may be employed.

Any common high-k solvent used in the art may be used. Non-limiting examples of the high-k solvent are cyclic carbonates, such as fluorinated ethylene carbonate, ethylene carbonate, propylene carbonate, and butylene carbonate, or gamma-butyrolactone, and/or mixtures thereof. Any common low-boiling point solvent used in the art may be used. Non-limiting examples of the low-boiling point solvent are cyclic carbonates, such as dimethyl carbonate, ethylmethyl carbonate, diethyl carbonate, and dipropyl carbonate, or dimethoxyethane, diethoxyethane, fatty acid ester derivative, and/or mixtures thereof.

When a mixed solvent of the high-k solvent and low-boiling point solvent is used, the mixing ratio of the high-k solvent to the low-boiling point solvent may be, but is not limited to, from about 1:1 to 1:9 by volume. When the mixing ratio of the two solvents is within this range, discharge capacity and charge/discharge lifetime characteristics are improved. However, the mixing ratio.

The amount of the lithium salt may be from about 5 to about 50 wt %, and in some embodiments, from about 10 to about 40 wt %, and in some other embodiments, from about 15 to about 30 wt %, based on the total weight of the electrolyte composition.

The amount of the organic solvent may be from about 30 to about 95 wt %, and in some embodiments, from about 40 to about 90 wt %, and in some other embodiments, from about 50 to about 90 wt %, based on the total weight of the electrolyte composition.

According to an embodiment of the present disclosure, there is provided a lithium battery including a positive electrode, a negative electrode, a separator, and the gel polymer electrolyte described above. An example of manufacturing the lithium battery is as follows.

First, a positive electrode plate is prepared. A positive electrode active material, a conducting agent, a binder, and a solvent are mixed together to prepare a positive electrode active material composition. The positive electrode active material composition may be directly coated on an aluminum current collector and dried to prepare a positive electrode plate. In some embodiments, the positive electrode active material composition may be cast on a separate support to form a positive electrode active material film, which may be then separated from the support and laminated on the aluminum current collector to prepare a positive electrode plate. In some embodiments, the positive electrode active material composition may be prepared in an electrode ink form including a large amount of solvent, which may then be printed on a support using ink-jetting or Gravure printing to form a positive electrode plate. Any of a variety of conventional printing and coating methods may be used.

The positive electrode active material used in the positive electrode may be any one commonly used in the art, for example, may be a lithium-containing metal oxide. The common positive electrode active material may be at least one of a composite oxide of lithium with a metal selected from among Co, Mn, Ni, and a combination thereof. For example, the common positive electrode active material may be at least one compound of $Li_aA_{1-b}B_bD_2$ (wherein $0.90 \le a \le 1.8$, and $0 \le b \le 0.5$); $Li_aE_{1-b}B_bO_{2-c}D_c$ (wherein $0.90 \le a \le 1.8$, $0 \le b \le 0.5$, and $0 \leq c \leq 0.05$); $LiE_{2-b}B_bO_{4-c}D_c$ (wherein $0 \leq b \leq 0.5$, $0 \leq c \leq 0.05$); $Li_aNi_{1-b-c}Co_bB_cD_\alpha$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Co_bB_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB_cO_{2-\alpha}F_2$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_2$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$, and $0.001 \leq b \leq 0.1$); $Li_aCoG_bO_2$ (wherein $0.90 \leq a \leq 1.8$, and $0.001 \leq b \leq 0.1$); $Li_aMnG_bO_2$ (wherein $0.90 \leq a \leq 1.8$, and $0.001 \leq b \leq 0.1$); $Li_aMn_2G_bO_4$ (wherein $0.90 \leq a \leq 1.8$, and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$:

In the formulae above, A is selected from the group consisting of nickel (Ni), cobalt (Co), manganese (Mn), and combinations thereof; B is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from the group consisting of oxygen (O), fluorine (F), sulfur (S), phosphorus (P), and combinations thereof; E is selected from the group consisting of cobalt (Co), manganese (Mn), and combinations thereof; F is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; I is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Cu), and combinations thereof.

Examples of the common positive electrode active material include $LiCoO_2$, $LiMn_xO_{2x}$ (x=1, 2), $LiNi_{1-x}Mn_xO_{2x}$ (0<x<1), $LiNi_{1-x-y}Co_xMn_yO_2$ ($0 \leq x \leq 0.5$, $0 \leq y \leq 0.5$), and $LiFePO_4$.

The compounds listed above as positive electrode active materials may have a surface coating layer (hereinafter, "coating layer"). Alternatively, a mixture of a compound without a coating layer and a compound having a coating layer, the compounds being selected from the compounds listed above, may be used. The coating layer may include at least one compound of a coating element selected from the group consisting of oxide, hydroxide, oxyhydroxide, oxycarbonate, and hydroxycarbonate of the coating element. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using any method that does not adversely affect the physical properties of the positive electrode active material when a compound of the coating element is used. For example, the coating layer may be formed using any conventional spray coating method, a dipping method, or the like; thus a detailed description thereof will be omitted.

An example of the conducting agent is carbon black. Examples of the binder are a vinylidene fluoride/hexafluoropropylene copolymer, polyvinylidene fluoride (PVDF), polyacrylonitrile, polymethylmethacrylate, polytetrafluoroethylene, mixtures thereof, or, polyimide, polyamideimide, styrene-butadiene rubber polymer, acrylate-based rubber, and sodium carboxymethylcellulose. Examples of the solvent are N-methyl-pyrrolidone, acetone, and water.

The amounts of the positive electrode active material, the conducting agent, the binder, and the solvent used in the manufacture of the lithium battery are those levels that are generally used in the art.

Next, a negative electrode plate is prepared. As in the preparation of the positive electrode plate described above, a negative electrode active material, a conducting agent, a binder, and a solvent are mixed together to prepare a negative electrode active material composition. The negative electrode active material composition may be directly coated on a copper foil current collector and dried to obtain a negative electrode plate. In some other embodiments, the negative electrode active material composition may be cast on a separate support to form a negative electrode active material film, which may be then separated from the support and laminated on a copper current collector to prepare the negative electrode plate. In some embodiments, the negative electrode active material composition may be prepared in an electrode ink form including a large amount of solvent, which may then be printed on a support using ink-jetting or Gravure printing to form a negative electrode plate. Any of a variety of conventional printing and coating methods may be used.

Non-limiting examples of the negative electrode active material are graphite-based material, such as graphite particles; metals alloyable with lithium, such as silicon fine-particles; graphite/silicon composite materials; transition metals such as lithium titanium oxide ($Li_4Ti_5O_{12}$). Any common negative electrode active material used in the art may be used. For example, the graphite particles may be derived from natural graphite or artificial graphite. The graphite particles may have a particle size of from about 5 to about 30 μm. The silicon fine-particles may have a particle size of from about 50 nm to about 10 μm, but is not limited thereto. The graphite particles and silicon fine-particles may be processed using any suitable method used in the art, for example, mechanical milling, to form a graphite/silicon composite material.

The same conducting agent, binder and solvent as those for the positive electrode may be used for the negative electrode. The amounts of the negative electrode active material, the conducting agent, the binder, and the solvent may be those levels that are generally used in the manufacture of lithium batteries in the art.

In some embodiments, a plasticizer may be further added to the positive electrode active material composition and the negative electrode active material composition to allow formation of pores in the positive electrode and negative electrode plates.

Next, a separator is prepared. The positive electrode and the negative electrode may be separated from each other by the separator. Any separator that is commonly used in lithium batteries may be used. The separator should have low resistance to migration of ions in an electrolyte and have a high electrolyte-retaining ability. Examples of the separator include glass fiber, polyester, Teflon, polyethylene, polypropylene, polytetrafluoroethylene (PTFE), or a combination thereof, each of which may be a non-woven or woven fabric. For example, a windable separator including polyethylene or polypropylene may be used for a lithium ion battery. A separator with good organic electrolyte solution retaining capability should be used for a lithium ion polymer battery.

The separator may be manufactured as follows. A polymer resin, a filler and a solvent are mixed to prepare a separator composition. The separator composition is directly coated on an electrode, and then dried to form a separator film. Alternately, the separator composition may be cast onto a separate support, dried, detached from the separate support, and finally laminated on an upper portion of the electrode, thereby forming a separator film.

The polymer resin is not particularly limited, and may be any suitable material that is commonly used as a binder for electrode plates. Examples of the polymer resin are a vinylidenefluoride/hexafluoropropylene copolymer, polyvinylidene fluoride (PVDF), polyacrylonitrile, polymethylmethacrylate, and mixtures thereof. For example, a vinylidenefluoride/hexafluoropropylene copolymer containing 8 to 25 wt % of hexafluoropropylene may be used.

Next, an electrolyte is prepared. The gel polymer electrolyte according to any of the above-described embodiments of the present disclosure may be used. For example, the gel polymer electrolyte may include: an organic solvent; a lithium salt, and a block copolymer formed through polymerization of a macro azo initiator including a polyethylene oxide repeating unit represented by Formula 1 below, and a multi-functional urethane acrylate-based monomer:

Formula 1

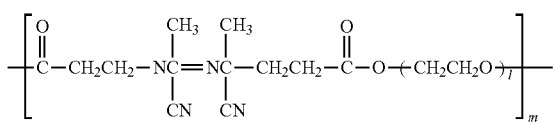

In Formula 1, l is from 5 to 200, and m is from 5 to 50.

The multi-functional urethane acrylate-based monomer may include a urethane diacrylate-based monomer represented by Formula 2 below:

Formula 2

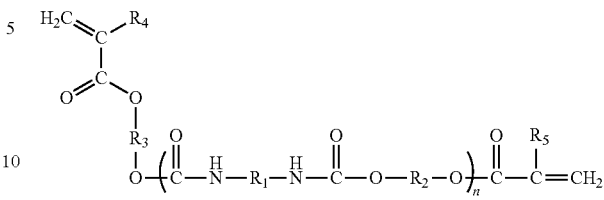

In Formula 2, n is from 1 to 1,000;

$R_1$, $R_2$, and $R_3$ are each, independently, a substituted or unsubstituted $C_{1-20}$ alkylene group, a substituted or unsubstituted $C_{5-20}$ cycloalkylene group, a substituted or unsubstituted $C_{6-20}$ arylene group, or $R_z$-A-$R_z$ where A is O, a single bond, an ester group, a carbonyl group, a carbonate group, a methylene group, an ethylene group, an oxymethylene group, or an oxyethylene group, and $R_z$ is a substituted or unsubstituted $C_{6-20}$ arylene group; and $R_4$ and $R_5$ are each independently a hydrogen atom or a methyl group, wherein if the $C_{1-20}$ alkylene, the $C_{5-20}$ cycloalkylene group, or $C_{6-20}$ arylene group of $R_1$, $R_2$ and $R_3$ are substituted, they each independently have a substituent selected from among a halogen group, a cyano group, —OR (where R is a hydrogen atom, a $C_{1-10}$ alkyl group, or a $C_{6-20}$ aryl group), —C(=O)$R_a$, —C(=O)O$R_a$, —OCO(O$R_a$), —(X)$_n$—NH$_2$ (where X is a $C_{1-10}$ alkyl group, or a $C_{1-10}$ alkoxy group, and n is an integer from 0 to 10), —C=N($R_a$), —S$R_a$, —S(=O)$R_a$, —S(=O)$_2R_a$, —P$R_a$, a $C_{1-20}$ alkyl group, a $C_{1-20}$ alkoxy group, a $C_{2-20}$ alkenyl group, a $C_{2-20}$ alkynyl group, a $C_{2-20}$ alkylene oxide group, a $C_{3-30}$ cycloalkyl group, a $C_{6-30}$ aryl group, a $C_{6-30}$ aryloxy group, a $C_{6-30}$ heteroaryl group, or a combination thereof, and wherein $R_a$ is a hydrogen atom, a $C_{1-10}$ alkyl group, or a $C_{6-20}$ aryl group.

For example, the substituted $C_{1-20}$ alkylene group, $C_{5-20}$ cycloalkylene group or $C_{6-20}$ arylene group may be each independently, a fluorine-substituted $C_{1-5}$ alkyl group, an unsubstituted $C_{1-5}$ alkyl group, a hydroxyl-substituted $C_{1-20}$ alkylene group, a $C_{5-20}$ cycloalkylene group, or a $C_{6-20}$ arylene group.

The block copolymer may include a repeating unit represented by Formula 4 below:

Formula 4

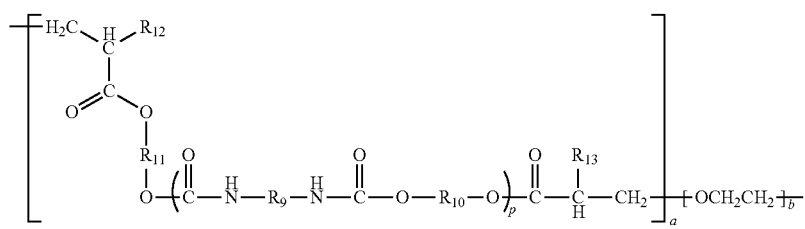

In Formula 4, a is from 1 to 2,000; b is from 5 to 200; p is from 1 to 1,000;

$R_9$, $R_{10}$, and $R_{11}$ are each independently a substituted or unsubstituted $C_{1-20}$ alkylene group, a substituted or unsubstituted $C_{5-20}$ cycloalkylene group, a substituted or unsubstituted $C_{6-20}$ arylene group, or $R_z$-A-$R_z$ where A is O, a single bond, an ester group a carbonyl group, a carbonate group, a methylene group, an ethylene group, an oxymethylene group, or an oxyethylene group, and $R_z$ is a substituted or unsubstituted $C_{6-20}$ arylene group; and $R_{12}$ and $R_{13}$ are each independently a hydrogen atom or a methyl group, wherein if the $C_{1-20}$ alkylene group, the $C_{5-20}$ cycloalkylene group, or the $C_{6-20}$ arylene group of $R_9$, $R_{10}$ or $R_{11}$ are substituted, they each independently have a substituent selected from among a halogen group, a cyano group, —OR (where R is a hydrogen atom, a $C_{1-10}$ alkyl group, or a $C_{6-20}$ aryl group), —C(=O)$R_a$, —C(=O)O$R_a$, —OCO(O$R_a$), —(X)$_n$—NH$_2$ (where X is a $C_{1-10}$ alkyl group, or a $C_{1-10}$ alkoxy group, and n is an integer from 0 to 10), —C=N($R_a$), —S$R_a$, —S(=O)$R_a$, —S(=O)$_2R_a$, —P$R_a$, a $C_{1-20}$ alkyl group, a $C_{1-20}$ alkoxy group, a $C_{2-20}$ alkenyl group, a $C_{2-20}$ alkynyl group, a $C_{2-20}$ alkylene oxide group, a $C_{3-30}$ cycloalkyl group, a $C_{6-30}$ aryl group, a $C_{6-30}$ aryloxy group, a $C_{6-30}$ heteroaryl group, or a combination thereof, and wherein $R_a$ is a hydrogen atom, a $C_{1-10}$ alkyl group, or a $C_{6-20}$ aryl group.

For example, the substituted $C_{1-20}$ alkylene group, the substituted $C_{5-20}$ cycloalkylene group or the substituted $C_{6-20}$ arylene group may be each, independently, a fluorine-substituted $C_{1-5}$ alkyl group, an unsubstituted $C_{1-5}$ alkyl group, a hydroxyl-substituted $C_{1-20}$ alkylene group, a $C_{5-20}$ cycloalkylene group, or a $C_{6-20}$ arylene group.

Examples of the "$C_{1-20}$ alkylene group", the "$C_{5-20}$ cycloalkylene group", and the "$C_{6-20}$ arylene group" in Formula 4, and examples of the "ester group," "carbonyl group", "carbonate group", "oxymethylene group", and "oxyethylene group" are the same as those described in conjunction with Formula 2 above. Substituent(s) on the $C_{1-20}$ alkylene group, $C_{5-20}$ cycloalkylene group, or $C_{6-20}$ arylene group in Formula 4 above may be the same as those defined in conjunction with Formula 2 above.

The block copolymer may further include an acrylate repeating unit represented by Formula 5 below:

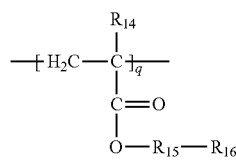

Formula 5

In Formula 5, q is from 1 to 5,000;

$R_{14}$ is a hydrogen atom or a methyl group;

$R_{15}$ is a substituted or unsubstituted $C_1$-$C_{20}$ alkylene group; and $R_{16}$ is a hydrogen atom, a fluorine atom, a $C_{1-20}$ alkyl group, or a $C_{1-20}$ fluorinated alkyl group, The $C_{1-20}$ alkylene group of $R_{15}$, if substituted, has a substituent selected from among a halogen group, a cyano group, —OR (where R is a hydrogen atom, a $C_{1-10}$ alkyl group, or a $C_{6-20}$ aryl group), —C(=O)$R_a$, —C(=O)O$R_a$, —OCO (O$R_a$), —(X)$_n$—NH$_2$ (where X is a $C_{1-10}$ alkyl group or a $C_{1-10}$ alkoxy group, and n is an integer from 0 to 10), —C=N($R_a$), —S$R_a$, —S(=O)$R_a$, —S(=O)$_2R_a$, —P$R_a$, a $C_{1-20}$ alkyl group, a $C_{1-20}$ alkoxy group, a $C_{2-20}$ alkenyl group, a $C_{2-20}$ alkynyl group, a $C_{2-20}$ alkylene oxide group, a $C_{3-30}$ cycloalkyl group, a $C_{6-30}$ aryl group, a $C_{6-30}$ aryloxy group, a $C_{6-30}$ heteroaryl group, or a combination thereof, wherein $R_a$ is a hydrogen atom, a $C_{1-10}$ alkyl group, or a $C_{6-20}$ aryl group. For example, the substituted $C_{1-20}$ alkylene may be each independently, a fluorine-substituted $C_{1-5}$ alkyl group, an unsubstituted $C_{1-5}$ alkyl group, or a hydroxyl-substituted $C_{1-20}$ alkylene group.

Examples of the "$C_{1-20}$ alkylene group" in Formula 5, and examples of the "ester group", "carbonyl group", "carbonate group", "oxymethylene group", and "oxyethylene group" are the same as those described in conjunction with Formula 2 above. Substituent(s) on the $C_{1-20}$ alkylene group, $C_{5-20}$ cycloalkylene group, or $C_{6-20}$ arylene group in Formula 5 above may be the same as those defined in conjunction with Formula 2 above.

The block copolymer may be a block copolymer including a polyethylene oxide group (—CH$_2$CH$_2$O) and a urethane group (—NHCOO).

The block copolymer may form a cross-linked network matrix.

The separator is interposed between the positive electrode plate and the negative electrode to form a battery assembly. The battery assembly is wound or folded and encased in a spherical battery case or a rectangular battery case. Afterward, a macro azo initiator including the polyethylene oxide repeating unit represented by Formula 1 above, and the multi-functional urethane acrylate-based monomer of Formula 2 above is sequentially or simultaneously supplied into the battery assembly, thereby completing the manufacture of a lithium ion polymer battery. The macro azo initiator and the multi-functional urethane acrylate-based monomer may be polymerized with each other through polymerization, for example, by heating, thus forming a gel polymer electrolyte that forms a cross-linked network matrix with repeating units of a polyethylene oxide group (—CH$_2$CH$_2$O) and urethane group (—NHCOO). A lithium ion polymer battery including the gel polymer electrolyte is thus prepared.

The lithium ion polymer battery may be a flexible battery with a varying shape. For example, the lithium ion polymer battery may be readily bendable.

The gel polymer electrolyte may be prepared, for example, by preparing a solution of a lithium salt dissolved in an organic solvent, a macro azo initiator including a polyethylene oxide repeating unit represented by Formula 1 below, and a multi-functional urethane acrylate-based monomer; mixing the macro azo initiator and the multi-functional urethane acrylate-based monomer together in the solution to prepare an electrolyte composition; and polymerizing the electrolyte composition.

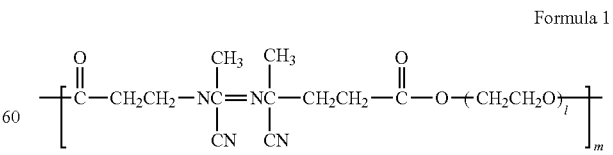

Formula 1

In Formula 1, l is from 5 to 200, and m is from 5 to 50.

The multi-functional urethane acrylate-based monomer may include a urethane diacrylate-based monomer represented by Formula 2 below:

Formula 2

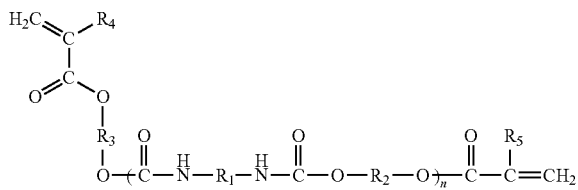

In Formula 2, n is from 1 to 1,000;

$R_1$, $R_2$, and $R_3$ are each, independently, a substituted or unsubstituted $C_{1-20}$ alkylene group, a substituted or unsubstituted $C_{5-20}$ cycloalkylene group, a substituted or unsubstituted $C_{6-20}$ arylene group, or $R_z$-A-$R_z$ where A is a single bond, an ester group, an ether group, a carbonyl group, a carbonate group, a methylene group, an ethylene group, an oxymethylene group, or an oxyethylene group, and $R_z$ is a substituted or unsubstituted $C_{6-20}$ arylene group; and $R_4$ and $R_5$ are each independently a hydrogen atom or a methyl group, wherein if the $C_{1-20}$ alkylene group, the $C_{5-20}$ cycloalkylene group, or the $C_{6-20}$ arylene group of $R_1$, $R_2$ or $R_3$ are substituted, they each independently have a substituent selected from among a halogen group, a cyano group, —OR (where R is a hydrogen atom, a $C_{1-10}$ alkyl group, or a $C_{6-20}$ aryl group), —C(=O)$R_a$, —C(=O)O$R_a$, —OCO(O$R_a$), —(X)$_n$—NH$_2$ (where X is a $C_{1-10}$ alkyl group, or a $C_{1-10}$ alkoxy group, and n is an integer from 0 to 10), —C=N($R_a$), —S$R_a$, —S(=O)$R_a$, —S(=O)$_2R_a$, —P$R_a$, a $C_{1-20}$ alkyl group, a $C_{1-20}$ alkoxy group, a $C_{2-20}$ alkenyl group, a $C_{2-20}$ alkynyl group, a $C_{2-20}$ alkylene oxide group, a $C_{3-30}$ cycloalkyl group, a $C_{6-30}$ aryl group, a $C_{6-30}$ aryloxy group, a $C_{6-30}$ heteroaryl group, or a combination thereof, and wherein $R_a$ is a hydrogen atom, a $C_{1-10}$ alkyl group, or a $C_{6-20}$ aryl group.

For example, the substituted $C_{1-20}$ alkylene group, $C_{5-20}$ cycloalkylene group or $C_{6-20}$ arylene group may be each independently a fluorine-substituted $C_{1-5}$ alkyl group, an unsubstituted $C_{1-5}$ alkyl group, a hydroxyl-substituted $C_{1-20}$ alkylene group, a $C_{5-20}$ cycloalkylene group, or a $C_{6-20}$ arylene group.

The polymerization of the electrolyte composition may include curing performed at a temperature of from about 50° C. to about 150° C. for about 0.5 hours to about 10 hours.

Preparation of the gel polymer electrolyte involves polymerization without additional processes, and thus is simple and easy. Examples of the organic solvent and lithium salts are the same as those described above.

Hereinafter, one or more embodiments of the present disclosure will be described in detail with reference to the following examples. However, these examples are not intended to limit the purpose and scope of the one or more embodiments of the disclosure.

EXAMPLES

Preparation of Electrolyte Composition

Example 1

1.3 M LiPF$_6$ was dissolved in 10 mL of a mixed solution of ethylene carbonate (EC), ethylmethyl carbonate (EMC), and diethylene carbonate (DEC) in a volume ratio of 3:2:5, to obtain a solution. 2 wt % of a macro azo initiator represented by Formula 6 below (of which the total molecular weight is about 20,000, and which includes a polyethylene oxide repeating unit having an Mn of about 2,000; PEG 2000, available from Wako Chemical Co., Japan), and 5 wt % of a urethane diacrylate monomer represented by Formula 7 below were added to the solution to prepare an electrolyte composition.

Formula 6

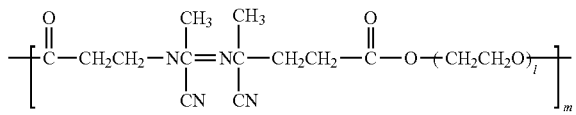

In Formula 6, l is from about 40 to about 50; and m is from about 8 to about 12.

Formula 7

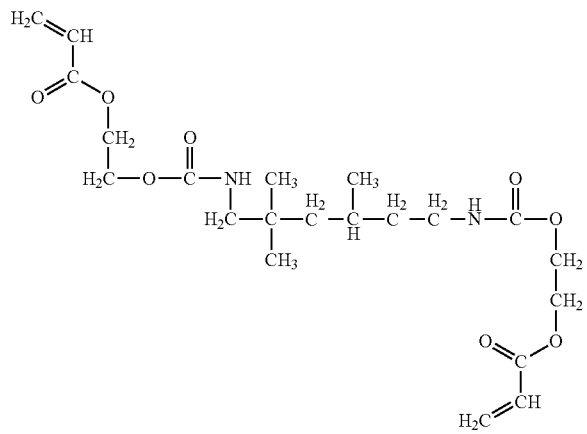

Example 2

An electrolyte composition was prepared in the same manner as in Example 1, except that the macro azo initiator of Formula 6 above (of which the total molecular weight is about 20,000, and which includes a polyethylene oxide repeating unit having an Mn of about 2,000; PEG 2000, available from Wako Chemical Co., Japan) was used in an amount of 5 wt %, instead of 2 wt %; and 5 wt % of the urethane diacrylate monomer represented by Formula 7 above was used, together with 2 wt % of hexylacrylate represented by Formula 8 below.

Formula 8

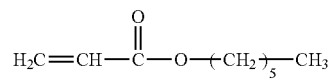

Example 3

An electrolyte composition was prepared in the same manner as in Example 1, except that 5 wt % of a macro azo initiator represented by Formula 9 below (of which the total molecular weight is about 29,000 and which includes a polyethylene oxide repeating unit having an Mn of about 4,000; PEG 4000, available from Wako Chemical Co., Japan) was used instead of 2 wt % of the macro azo initiator of Formula 6 above (of which the total molecular weight is about 20,000, and which includes a polyethylene oxide repeating unit having an Mn of about 2,000; PEG 2000, available from Wako Chemical Co., Japan); and 5 wt % of the urethane diacrylate monomer represented by Formula 7 above was used, not alone, together with 2 wt % of hexylacrylate represented by Formula 8 above.

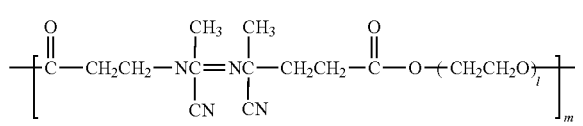

Formula 9

In Formula 9, l is from about 80 to about 100; and m is from about 6 to about 9.

Example 4

An electrolyte composition was prepared in the same manner as in Example 1, except that the macro azo initiator of Formula 6 above (of which the total molecular weight is about 20,000, and which includes a polyethylene oxide repeating unit having an Mn of about 2,000; PEG 2000, available from Wako Chemical Co., Japan) was used in an amount of 3 wt %, instead of 2 wt %; and 5 wt % of the urethane diacrylate monomer represented by Formula 7 above was used, together with 2 wt % of 2,2,2-trifluoroethylacrylate represented by Formula 10 below.

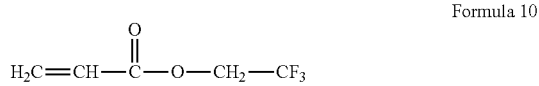

Formula 10

Example 5

An electrolyte composition was prepared in the same manner as in Example 1, except that the macro azo initiator of Formula 6 above (of which the total molecular weight is about 20,000, and which includes a polyethylene oxide repeating unit having an Mn of about 2,000; PEG 2000, available from Wako Chemical Co., Japan) was used in an amount of 3 wt %, instead of 2 wt %; and 5 wt % of the multifunctional urethane acrylate monomer represented by Formula 7 above was used, together with 2 wt % of 2,2,2-trifluoroethyl methacrylate represented by Formula 11 below.

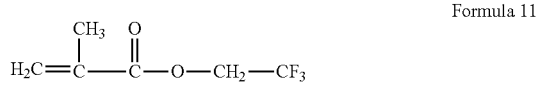

Formula 11

Example 6

An electrolyte composition was prepared in the same manner as in Example 1, except that the macro azo initiator of Formula 6 above (of which the total molecular weight is about 20,000, and which includes a polyethylene oxide repeating unit having an Mn of about 2,000; PEG 2000, available from Wako Chemical Co., Japan) was used in an amount of 4 wt %, instead of 2 wt %; and 5 wt % of the urethane diacrylate monomer represented by Formula 7 above was used, together with 2 wt % of the hexylacrylate represented by Formula 8 above and 3 wt % of the 2,2,2-trifluoroethylacrylate represented by Formula 10 above.

Example 7

An electrolyte composition was prepared in the same manner as in Example 1, except that 4 wt % of the macro azo initiator represented by Formula 9 above (of which the total molecular weight is about 29,000 and which includes a polyethylene oxide repeating unit having an Mn of about 4,000; PEG 4000, available from Wako Chemical Co., Japan) was used instead of 2 wt % of the macro azo initiator of Formula 6 above (of which the total molecular weight is about 20,000, and which includes a polyethylene oxide repeating unit having an Mn of about 2,000; PEG 2000, available from Wako Chemical Co., Japan); and 5 wt % of the urethane diacrylate monomer represented by Formula 7 above was used, together with 2 wt % of the hexylacrylate represented by Formula 8 above and 3 wt % of the 2,2,2-trifluoroethylacrylate represented by Formula 10 above.

Example 8

An electrolyte composition was prepared in the same manner as in Example 1, except that the macro azo initiator of Formula 6 above (of which the total molecular weight is about 20,000, and which includes a polyethylene oxide repeating unit having an Mn of about 2,000; PEG 2000, available from Wako Chemical Co., Japan) was used in an amount of 4 wt %, instead of 2 wt %; and 5 wt % of the urethane diacrylate monomer represented by Formula 7 above was used, together with 2 wt % of the hexylacrylate represented by Formula 8 above and 3 wt % of the 2,2,2-trifluoroethyl methacrylate represented by Formula 11 above.

Example 9

An electrolyte composition was prepared in the same manner as in Example 1, except that 4 wt % of the macro azo initiator represented by Formula 9 above (of which the total molecular weight is about 29,000 and which includes a polyethylene oxide repeating unit having an Mn of about 4,000; PEG 4000, available from Wako Chemical Co., Japan) was used instead of 2 wt % of the macro azo initiator of Formula 6 above (of which the total molecular weight is about 20,000, and which includes a polyethylene oxide repeating unit having an Mn of about 2,000; PEG 2000, available from Wako Chemical Co., Japan); and 5 wt % of the urethane diacrylate monomer represented by Formula 7 above was used, together with 2 wt % of the hexylacrylate represented by Formula 8 above and 3 wt % of the 2,2,2-trifluoroethyl methacrylate represented by Formula 11 above.

Comparative Example 1

An electrolyte composition was prepared in the same manner as in Example 1, except that 0.05 wt % of 2,2'-azobisisobutyronitrile represented by Formula 12 below was used instead of 2 wt % of the macro azo initiator of Formula 6 above (of which the total molecular weight is about 20,000, and which includes a polyethylene oxide repeating unit having an Mn of about 2,000; PEG 2000, available from Wako Chemical Co., Japan); and the urethane diacrylate monomer represented by Formula 7 above was used in an amount of 7 wt %, instead of 5 wt %

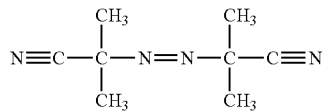

Formula 12

Comparative Example 2

An electrolyte composition was prepared in the same manner as in Example 1, except that 0.05 wt % of 2,2'-azobisisobutyronitrile represented by Formula 12 above was used instead of 2 wt % of the macro azo initiator of Formula 6 above (of which the total molecular weight is about 20,000, and which includes a polyethylene oxide repeating unit having an Mn of about 2,000; PEG 2000, available from Wako Chemical Co., Japan); and 5 wt % of the urethane diacrylate monomer represented by Formula 7 above was used, together with 2 wt % of the hexylacrylate represented by Formula 8 above.

Preparation of Gel Polymer Electrolyte and Lithium Battery

Example 10

97 parts by weight of graphite particles (available from Japan Carbon Co.) with an average particle diameter of about 25 μm, 1.5 wt % of styrene-butadiene rubber, and 1.5 wt % of sodium carboxymethylcellulose were mixed together using an agate mortar to prepare a slurry. The slurry was coated on a 15 μm-thick Cu current collector to a thickness of about 50 μm using a doctor blade. Then, the coated collector was dried in a hot-air dryer at about 80° C. for about 12 hours, and then dried again at 120° C. in a vacuum for 2 hours, to manufacture a negative electrode plate.

LiCoO$_2$ powder having an average particle diameter of about 20 μm and a carbon conducting agent (Super P, available from TIMCAL) were uniformly mixed in a weight ratio of 93:3, and then a polyvinylidene fluoride (PVDF) binder solution was added thereto to prepare a slurry containing the positive electrode active material, the carbonaceous conducting agent, and the binder in a weight ratio of 93:3:4.

The slurry was coated on a 15 μm-thick aluminum foil to a thickness of about 50 μm. Then, the coated foil was dried in a hot-air dryer at about 80° C. for about 12 hours, and then dried again at 120° C. in a vacuum for 2 hours, to manufacture a positive electrode plate.

With a polypropylene separator (Celgard 3510) disposed between the positive electrode and negative electrode plates used in a 5 cm×10 cm pouch-type cell, the electrolyte composition of Example 1 was injected into the pouch cell and was then polymerized at about 75° C. for about 4 hours to be cured, thus forming a gel polymer electrolyte with repeating units of a polyethylene oxide group (—CH$_2$CH$_2$O) and urethane group (—NHCOO) in a cross-linked network matrix, thereby completing the manufacture of the 5 cm×10 cm pouch-type cell including the gel polymer electrolyte.

Example 11

A gel polymer electrolyte and a pouch-type cell including the gel polymer electrolyte were prepared in the same manner as in Example 10, except that the electrolyte composition of Example 2, instead of the electrolyte composition of Example 1, was used.

Example 12

A gel polymer electrolyte and a pouch-type cell including the gel polymer electrolyte were prepared in the same manner as in Example 10, except that the electrolyte composition of Example 3, instead of the electrolyte composition of Example 1, was used.

Example 13

A gel polymer electrolyte and a pouch-type cell including the gel polymer electrolyte were prepared in the same manner as in Example 10, except that the electrolyte composition of Example 4, instead of the electrolyte composition of Example 1, was used.

Example 14

A gel polymer electrolyte and a pouch-type cell including the gel polymer electrolyte were prepared in the same manner as in Example 10, except that the electrolyte composition of Example 5, instead of the electrolyte composition of Example 1, was used.

Example 15

A gel polymer electrolyte and a pouch-type cell including the gel polymer electrolyte were prepared in the same manner as in Example 10, except that the electrolyte composition of Example 6, instead of the electrolyte composition of Example 1, was used.

Example 16

A gel polymer electrolyte and a pouch-type cell including the gel polymer electrolyte were prepared in the same manner as in Example 10, except that the electrolyte composition of Example 7, instead of the electrolyte composition of Example 1, was used.

Example 17

A gel polymer electrolyte and a pouch-type cell including the gel polymer electrolyte were prepared in the same manner as in Example 10, except that the electrolyte composition of Example 8, instead of the electrolyte composition of Example 1, was used.

Example 18

A gel polymer electrolyte and a pouch-type cell including the gel polymer electrolyte were prepared in the same manner as in Example 10, except that the electrolyte composition of Example 9, instead of the electrolyte composition of Example 1, was used.

Comparative Example 3

A gel polymer electrolyte and a pouch-type cell including the gel polymer electrolyte were prepared in the same manner as in Example 10, except that the electrolyte composition of Comparative Example 1, instead of the electrolyte composition of Example 1, was used.

Comparative Example 4

A gel polymer electrolyte and a pouch-type cell including the gel polymer electrolyte were prepared in the same manner as in Example 10, except that the electrolyte composition of Comparative Example 2, instead of the electrolyte composition of Example 1, was used.

Lithium Battery Performance Test

Evaluation Example 1

Measurement of Ionic Conductivity

Disc-shaped samples were prepared from the gel polymer electrolytes of Examples 10-18 and Comparative Examples 3 and 4, and the ionic conductivities thereof at room temperature were measured in contact with a stainless steel electrode. The results are shown in Table 1 below.

TABLE 1

|  | Ionic conductivity (mS/cm) |
|---|---|
| Example 10 | 2.3 |
| Example 11 | 1.8 |
| Example 12 | 2.0 |
| Example 13 | 3.3 |
| Example 14 | 2.8 |
| Example 15 | 3.2 |
| Example 16 | 3.1 |
| Example 17 | 2.8 |
| Example 18 | 2.5 |
| Comparative Example 3 | 1.1 |
| Comparative Example 4 | 1.5 |

Referring to Table 1, the gel polymer electrolytes of Examples 10-18 were found to have improved ionic conductivities as compared with the gel polymer electrolytes of Comparative Examples 3 and 4.

Evaluation Example 2

Charge-Discharge Test

The pouch-type cells of Examples 10-18 and Comparative Examples 3 and 4 were each charged with a constant current of 0.5 C until the voltage of the cell reached 4.2 V (with respect to a Li electrode), and then charged again with a constant voltage to a current of $\frac{1}{20}$ C at 4.2V of the cell. Afterward, the cell was discharged at a constant current of 0.5 C until the voltage reached 3.0V (with respect to Li). This charging and discharging cycle was repeated 100 times.

A capacity retention rate of each cell was calculated using the results and Equation 1 below. The results are shown in Table 2 and FIG. 1.

Capacity retention rate at $100^{th}$ cycle (%) = $100^{th}$-cycle discharge capacity/$1^{st}$-cycle discharge capacity 100     Equation 1

TABLE 2

| Example | 1st-cycle discharge capacity (mAh) | $100^{th}$-cycle discharge capacity (mAh) | Capacity retention rate at $100^{th}$ cycle [%] |
|---|---|---|---|
| Example 10 | 96.4 | 63.2 | 78.7 |
| Example 11 | 96.4 | 75.9 | 73.1 |
| Example 12 | 96.1 | 65.0 | 74.5 |
| Example 13 | 96.5 | 70.6 | 88.3 |
| Example 14 | 96.9 | 72.2 | 83.5 |
| Example 15 | 96.7 | 85.4 | 87.3 |
| Example 16 | 96.1 | 80.2 | 88.9 |
| Example 17 | 96.4 | 84.1 | 86.7 |
| Example 18 | 96.7 | 86.0 | 85.6 |
| Comparative Example 3 | 96.2 | 83.4 | 65.5 |
| Comparative Example 4 | 96.7 | 82.8 | 67.7 |

Referring to Table 2 and FIG. 1, the pouch-type cells of Examples 10-18 were found to have higher capacity retention rates as compared with those of Comparative Examples 3 and 4.

As described above, according to the one or more of the above embodiments of the present disclosure, an electrolyte composition is provided that includes a macro azo initiator containing a polyethylene oxide repeating unit, and a multi-functional urethane acrylate-based monomer that has improved ionic conductivity. The electrolyte composition may be used as a gel polymer electrolyte. Also provided are lithium secondary batteries manufactured using the gel polymer electrolyte that have improved lifetime characteristics.

It should be understood that the exemplary embodiments described therein should be considered in a descriptive sense only and not for purposes of limitation. Descriptions of features or aspects within each embodiment should typically be considered as available for other similar features or aspects in other embodiments.

Although a few embodiments of the present disclosure have been shown and described, it will be appreciated by those skilled in the art that changes may be made in this embodiment without departing from the principles and spirit of the invention, the scope of which is defined in the claims and their equivalents.

What is claimed is:

1. A gel polymer electrolyte comprising: an organic solvent;
  a lithium salt; and
  a block copolymer formed through polymerization of a macro azo initiator including a polyethylene oxide repeating unit represented by Formula 1 below, and a multi-functional urethane acrylate-based monomer;

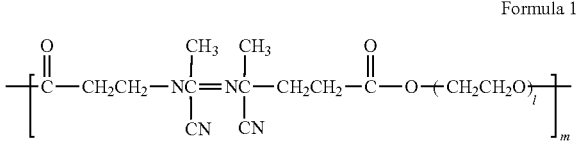

Formula 1 wherein, in Formula 1, l is from 5 to 200, and m is from 5 to 50, the polyethylene oxide repeating unit being uniformly distributed in a polymer main chain of the block copolymer, and wherein the multi-functional urethane acrylate-based monomer comprises a urethane diacrylate-based monomer represented by Formula 2 below:

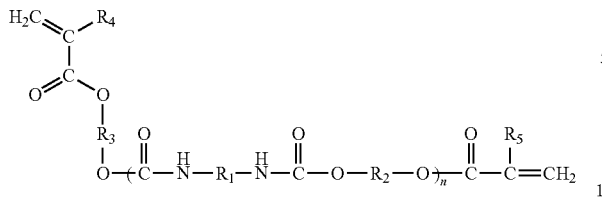

Formula 2 wherein, in Formula 2 above, n is from 1 to 1,000;

$R_1$, $R_2$, and $R_3$ are each independently a substituted or unsubstituted C1-20 alkylene group, substituted or unsubstituted C5-20 cycloalkylene group, and substituted or unsubstituted C6-20 arylene group; and R4 and R5 are each independently a hydrogen atom, wherein the substituted C1-20 alkylene, the substituted C5-20 cycloalkylene group, and the substituted C6-20 arylene group have each independently a substituent selected from among a halogen group, a cyano group, —OR (where R is a hydrogen atom, a C1-10 alkyl group, or a C6-20 aryl group), —C(=O)Ra, —C(=O)ORa, —OCO(ORa), —(X)n-NH2 (where X is a C1-10 alkyl group, or a C1-10 alkoxy group, and n is an integer from 0 to 10), —C=N(Ra), —SRa, —S(=O)Ra, —S(=O)2Ra, —PRa, a C1-20 alkyl group, a C1-20 alkoxy group, a C2-20 alkenyl group, a C2-20 alkynyl group, a C2-20 alkylene oxide group, a C3-30 cycloalkyl group, a C6-30 aryl group, a C6-30 aryloxy group, a C6-30 heteroaryl group, or a combination thereof, wherein Ra is a hydrogen atom, a C1-10 alkyl group, or a C6-20 aryl group, and wherein the block copolymer comprises a polyethylene oxide group (—CH2CH2O) and a urethane group (—NHCOO), and the polyethylene oxide group is in the polymer main chain of the block copolymer, and wherein an amount of the macro azo initiator is from about 0.5 wt % to about 30 wt % based on a total weight of the gel polymer electrolyte.

2. The gel polymer electrolyte of claim 1, wherein the block copolymer comprises a repeating unit represented by Formula 4 below:

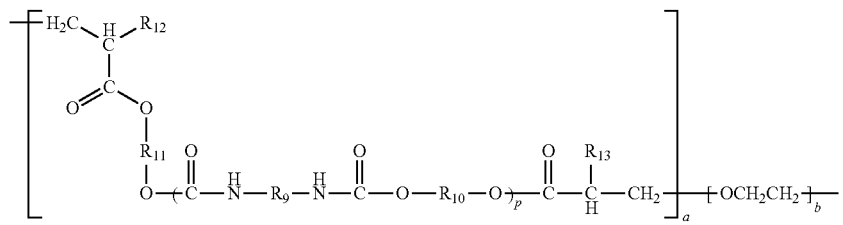

Formula 4 wherein, in Formula 4, a is from 1 to 2,000; b is from 5 to 200; p is from 1 to 1,000;

$R_9$, $R_{10}$, and $R_{11}$ are each independently a substituted or unsubstituted C1-20 alkylene group, substituted or unsubstituted C5-20 cycloalkylene group, and substituted or unsubstituted C6-20 arylene group; and R12 and R13 are each independently a hydrogen atom; wherein if the $C_{1-20}$ alkylene, the $C_{5-20}$ cycloalkylene group, or the substituted $C_{6-20}$ arylene group of $R_9$, R10 or R1 is substituted, they each independently have a substituent selected from among a halogen group, a cyano group, —OR (where R is a hydrogen atom, a C1-10 alkyl group, or a C6-20 aryl group), —C(=O)Ra, —C(=O)ORa, —OCO(ORa), —(X)1-NH2 (where X is a C1-10 alkyl group, or a C1-10 alkoxy group, and n is 0), —C=N(Ra), —SRa, —S(=0)Ra, —S(=0)2Ra, —PRa, a C1-20 alkyl group, a C1-20 alkoxy group, a C2-20 alkenyl group, a C2-20 alkynyl group, a C2-20 alkylene oxide group, a C3-30 cycloalkyl group, a C6-30 aryl group, a C6-30 aryloxy group, a C6-30 heteroaryl group, or a combination thereof, wherein Ra is a hydrogen atom, a C1-10 alkyl group, or a C6-20 aryl group.

3. The gel polymer electrolyte of claim 1, wherein the block copolymer further comprises an acrylate repeating unit represented by Formula 5 below:

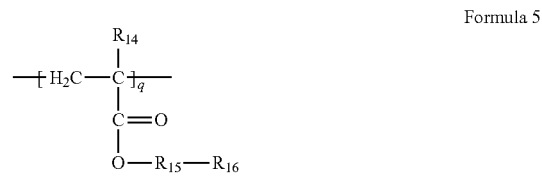

Formula 5 wherein, in Formula 5, q is from 1 to 5,000;

$R_{14}$ is a hydrogen atom or a methyl group;

$R_{15}$ is a substituted or unsubstituted $C_1$-$C_{20}$ alkylene group; and $R_{16}$ is a hydrogen atom, a fluorine atom, a $C_{1-20}$ alkyl group, or a $C_{1-20}$ fluorinated alkyl group, wherein if the $C_{1-20}$ alkylene group of $R_{15}$ is substituted it has a substituent selected from among a halogen group, a cyano group, —OR (where R is a hydrogen atom, a $C_{1-10}$ alkyl group, or a $C_{6-20}$ aryl group), —C(=O)$R_a$, —C(=O)O$R_a$, —OCO(O$R_a$), —(X)$_n$—NH$_2$ (where X is a $C_{1-10}$ alkyl group or a $C_{1-10}$ alkoxy group, and n is an integer from 0 to 10), —C=N($R_a$), —S$R_a$, —S(=O)$R_a$, —S(=O)$_2R_a$, —P$R_a$, a $C_{1-20}$ alkyl group, a $C_{1-20}$ alkoxy group, a $C_{2-20}$ alkenyl group, a $C_{2-20}$ alkynyl group, a $C_{2-20}$ alkylene oxide group, a $C_{3-30}$ cycloalkyl group, a $C_{6-30}$ aryl group, a $C_{6-30}$ aryloxy group, a $C_{6-30}$ heteroaryl group, or a combination thereof, wherein $R_a$ is a hydrogen atom, a $C_{1-10}$ alkyl group, or a $C_{6-20}$ aryl group.

4. The gel polymer electrolyte of claim 1, wherein the block copolymer forms a cross-linked network matrix.

5. The gel polymer electrolyte of claim 1, wherein an amount of the block copolymer is from about 3 wt % to about 70 wt % based on a total weight of the gel polymer electrolyte.

6. The gel polymer electrolyte of claim 1, wherein the polyethylene oxide repeating unit of the macro azo initiator has a number average molecular weight (Mn) of from about 200 to about 20,000 grams per mole.

7. The gel polymer electrolyte of claim 1, wherein the macro azo initiator has a number average molecular weight (Mn) of from about 10000 to about 100000 grams per mole.

8. The gel polymer electrolyte of claim 1, wherein the multi-functional urethane acrylate-based monomer has a number average molecular weight (Mn) of from about 250 to about 100000 grams per mole.

9. The gel polymer electrolyte of claim 1, wherein an amount of a repeating unit derived from the multi-functional urethane acrylate-based monomer is from about 1 wt % to about 50 wt % based on a total weight of the gel polymer electrolyte.

10. The gel polymer electrolyte of claim 3, wherein the acrylate repeating unit represented by Formula 5 comprises at least one selected from the group consisting of a methyl acrylate repeating unit, a methyl methacrylate repeating unit, an ethyl acrylate repeating unit, an ethyl methacrylate repeating unit, a propyl acrylate repeating unit, a propyl methacrylate repeating unit, a butyl acrylate repeating unit, a butyl methacrylate repeating unit, a hexyl acrylate repeating unit, a hexyl methacrylate repeating unit, an ethylhexyl acrylate repeating unit, an ethylhexyl methacrylate repeating unit, a 2,2,2-trifluoroethyl acrylate repeating unit, a 2,2,2-trifluoroethyl methacrylate repeating unit, a 2,2,3,3-tetrafluoropropyl acrylate repeating unit, a 2,2,3,3-tetrafluoropropyl methacrylate repeating unit, a 1,1,1,3,3,3-hexafluoro isopropyl acrylate repeating unit, a 1,1,1,3,3,3-hexafluoro isopropyl methacrylate repeating unit, a 2,2,3,3,4,4,4-heptafluorobutyl acrylate repeating unit, a 2,2,3,3,4,4,4-heptafluorobutyl methacrylate repeating unit, a 2,2,3,3,4,4,5,5-octafluoropentyl acrylate repeating unit, a 2,2,3,3,4,4,5,5-octafluoropentyl methacrylate repeating unit, a 2,2,3,3,4,4,5,5,6,6,7,7-dodecafluoroheptyl acrylate repeating unit, a 2,2,3,3,4,4,5,5,6,6,7,7-dodecafluoroheptyl methacrylate repeating unit, a 3,3,4,4,5,5,6,6,7,7,8,8-tridecafluorooctyl acrylate repeating unit, and a 3,3,4,4,5,5,6,6,7,7,8,8-tridecafluorooctyl methacrylate repeating unit.

11. The gel polymer electrolyte of claim 3, wherein an amount of the acrylate repeating unit represented by Formula 5 is from about 0.1 wt % to about 30 wt % based on a total weight of the gel polymer electrolyte.

12. The gel polymer electrolyte of claim 1, wherein the lithium salt comprises at least one selected from the group consisting of $LiBF_4$, $LiPF_6$, $LiAsF_6$, $LiSbF_6$, and $LiPF_3(CF_2CF_3)$.

13. The gel polymer electrolyte of claim 1, wherein the organic solvent is a high-dielectric constant (high-k) solvent, a low-boiling point solvent, or a mixed solvent thereof.

14. A lithium battery comprising a positive electrode, a negative electrode, a separator, and the gel polymer electrolyte of claim 1.

* * * * *